United States Patent
Yamasaki et al.

(10) Patent No.: US 6,640,054 B2
(45) Date of Patent: Oct. 28, 2003

(54) FOCUS DETECTING DEVICE

(75) Inventors: Ryo Yamasaki, Kanagawa (JP); Go Tokura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/938,869

(22) Filed: Aug. 24, 2001

(65) Prior Publication Data

US 2002/0044772 A1 Apr. 18, 2002

(30) Foreign Application Priority Data

| Aug. 30, 2000 | (JP) | ................................. | 2000/261496 |
| Sep. 21, 2000 | (JP) | ................................. | 2000/286319 |
| Nov. 15, 2000 | (JP) | ................................. | 2000/347359 |
| Feb. 23, 2001 | (JP) | ................................. | 2001/047460 |

(51) Int. Cl.[7] ..................... G03B 3/00; G03B 13/00
(52) U.S. Cl. ........................... 396/104; 396/111
(58) Field of Search .................. 396/89, 111, 114, 396/104, 125, 128, 268, 272

(56) References Cited

U.S. PATENT DOCUMENTS 6,088,537 A  *  7/2000  Ohtaka et al.  ............... 396/81

FOREIGN PATENT DOCUMENTS

JP  9-54243  *  2/1997  ............ G02B/7/34

* cited by examiner

Primary Examiner—Russell Adams
Assistant Examiner—Arthur A Smith
(74) Attorney, Agent, or Firm—Robin, Blecker & Daley

(57) ABSTRACT

Disclosed is a focus detecting device consisting mainly of a light receiving sensor, a reflecting mirror, a first detection circuit, and a focus detection circuit. The light receiving sensor has a plurality of photoelectric converters. The reflecting mirror is movable between a first position at which the reflecting mirror reflects light that comes from an objective, and routes the light to the light receiving sensor, and a second position at which the reflecting mirror recedes from the path of the light coming from the objective. The reflecting mirror has a member that helps form light distributions in a predetermined field on the light receiving sensor. Moreover, the reflecting mirror makes a return from the first position to the second position or vice versa. The first detection circuit detects a change in the light distributions formed in the predetermined field on the light receiving sensor which is observed between before and after the reflecting mirror makes a return. The focus detection circuit detects the focused state of the objective using a light reception signal produced in a field other than the predetermined field on the light receiving sensor and a detection value produced by the first detection circuit. Herein, the focus detecting device is incorporated in a camera.

20 Claims, 20 Drawing Sheets

FOCUS DETECTING DEVICE

BACKGROUND OF THE INVENTION

1. Field of the Invention

The present invention relates to an improvement in a focus detecting device that has a light receiving means composed of a plurality of photoelectric converters.

2. Description of the Related Art

A camera having a main mirror and a sub mirror designed to be movable has been proposed in the past. In the camera, the main mirror has a semi-transparent member that routes light, which has passed through a photography lens, to a viewfinder optical system. The sub mirror routes the light, which has passed through the semi-transparent member of the main mirror, to a focus detecting device. For focus detection or observation through a viewfinder, the main mirror and sub mirror are advanced to predetermined positions on a photographic light path, and brought to a standstill at the positions. For photography, the main mirror and sub mirror are withdrawn to recede from the photographic light path.

In this type of camera, when the number of movements made by the main mirror and sub mirror increases, members involved in driving the main mirror and sub mirror are worn down. This brings about a shift in the positions at which the main mirror and sub mirror come to a standstill during focus detection. Consequently, a change in an optical length for the light to be routed to the focus detecting device leads to a deviation of an in-focus position of an actual image plane from an in-focus position detected by the focus detecting device.

Japanese Unexamined Patent Publication No. 9-54243 has proposed a camera in which a relationship between the number of movements made by an optical member and a correction value by which a focus detection signal is corrected is stored in a memory in advance. During focus detection, the focus detection signal is corrected based on the number of movements detected at that time and the stored relationship between the number of movements and the correction value.

FIG. 25 shows the configuration of a major portion of a camera disclosed in the Japanese Unexamined Patent Publication No. 9-54243.

Referring to FIG. 25, there are shown a photography lens 101, a ray axis 101a of the photography lens, and an image recording medium 102 on which an object image that has passed through the photography lens 101 is projected. A main mirror 103 has a semi-transparent member that can be moved to recede from a photographic light path during photography. The main mirror 103 routes part of the light, which has passed through the photography lens 101, to a viewfinder optical system composed of a focusing screen 104, a pentagonal prism 105, and an eyepiece 106. On the other hand, the remaining light that has passed through the semi-transparent member of the main mirror 103 is reflected downward from a sub mirror 107 that can be moved while being interlocked with the main mirror 103. The light is then routed to a focus detecting device 108 of a known phase difference type composed of an image sensor, a pair of secondary image formation lenses, an aperture stop, and a field lens. The image sensor consists of a pair of photoelectric converter trains. The aperture stop has a pair of apertures.

Now, the principles of phase-difference type focus detection will be described in conjunction with FIG. 26. Components bearing the same reference numerals as the components shown in FIG. 25 have the same abilities as the components shown therein. Moreover, the main mirror 103 and sub mirror 107 are omitted from FIG. 26 for the brevity's sake. The field lens 115, the aperture stop 116 having a pair of apertures, the pair of secondary image formation lenses 117, and the image sensor 118 composed of a pair of photoelectric converter trains are developed along the ray axis 101a of the photography lens.

Light emanating from a point on the ray axis 101a passes through the photography lens 101, and then converges on a primary image plane that is optically conjugate to the image recording medium 102. After passing through the field lens 115, aperture stop 116, and secondary image formation lenses 117, the resultant light rays converge on the image sensors 118 with a certain distance between them. The field lens 115 is positioned so that the field lens 115 will converge an exit pupil 101b of the photography lens 101 and entrance pupils of the pair of secondary image formation lenses 117, that is, images formed near the aperture stop 116. The field lens 115 splits the exit pupil 101b of the photography lens 101 vertically in FIG. 26 to route the resultant images to the pair of apertures of the aperture stop 116.

Owing to the foregoing components, for example, the photography lens 101 is thrust leftward in FIG. 26. This causes light to converge on a plane on the left-hand side of the image recording medium 102. Consequently, the pair of images on the image sensor 118 is displaced in directions of arrows. The image sensor 118 detects the relative displacements of the pair of images, whereby the photography lens 101 can be focused. The same applies to a case where the photography lens 101 is thrust rightward in FIG. 26. Moreover, the same applies to an object point other than the point on the ray axis 101a of the photography lens 101.

The focus detecting device 108 designed based on the foregoing principles is used to detect the focus of the photography lens 101.

Referring back to FIG. 25, a microcomputer 109 controls actions to be performed in the camera. A CPU 109a, a ROM 109b, a RAM 109c, and an electrically erasable programmable ROM (EEPROM) 109d are incorporated in the microcomputer 109. Programs concerning focus detection and others are stored in the ROM 109b. A focus detection circuit 110 is connected to the image sensor 118. A mirror driving means 111 moves the main mirror 103 off the photographic light path. A mirror drive circuit 112 drives the mirror driving means 111. A lens driving means 113 is used to focus the photography lens 101. A lens drive circuit 114 drives the lens driving means 113.

A relationship between the number of movements made by the main mirror 103 and a correction value by which a focus detection signal is corrected, which has been acquired from experimental data in advance, is stored in the EEPROM 109d incorporated in the microcomputer 109. The number of movements made by the main mirror 103 up to the present is stored in the RAM 109b, while the relationship between the number of movements and the correction value by which a focus detection signal is corrected which is stored in the EEPROM 109d. Based on the number of movements made by the main mirror 103 and the relationship between the number of movements and the correction value, a focus detection signal produced by the focus detecting device 108 and focus detection circuit 110 is corrected according to the focus detection program stored in the ROM 109c. Consequently, when the number of movements made by the main mirror 103 and sub mirror 107 increases, a member that holds the main mirror 103 and sub mirror 107 so that the mirrors can be moved is worn down. This brings about a shift in positions at which the main mirror and sub mirror come to a standstill during focus detection. The shift in positions causes an optical length for a focus detection optical system to change. Consequently, an in-focus position detected by the focus detecting device 108 and focus detection circuit 110 deviates from an in-focus position on the image recording medium 102. However, since the focus detection signal is corrected based on the number of movements made by the main mirror 103, the focus of the photography lens can be detected highly precisely.

As a means for sensing an abnormal movement made by the main mirror 103 or sub mirror 107, it is generally known to sense the completion of a movement made by a mechanism using a contact switch or to detect the moved state of the mechanism using an encoder or the like.

Now, assume that a focus detection signal is corrected based on the relationship between the number of movements made by the main mirror 103 and sub mirror 107 and a correction value by which the focus detection signal is corrected. For example, when a case where the main mirror 103 is moved many times for a short period of time is compared with a case where the main mirror is moved after elapse of an appropriate time interval, even if the number of movements is the same between the cases, to what degree a member holding the main mirror 103 and sub mirror 107 is worn down or fatigued is different between the cases. An error in the focus detection signal therefore differs between the cases.

In the foregoing related art, the focus detection signal is corrected based on the number of movements made by the main mirror 103 and sub mirror 107 uniformly. It cannot therefore be expected that the focus detection signal is corrected appropriately.

Moreover, to what degree the member is worn down or fatigued varies depending on an error of each component from others occurring in the process of manufacturing or assembling. The focus detection signal cannot therefore be corrected appropriately.

Furthermore, a conventional widely-adopted method for sensing an abnormal movement made by the main mirror 103 or sub mirror 107 depends mainly on detection of a failure to move or a halt such as a suspension. The positions at which the main mirror 103 and sub mirror 107 stop cannot be detected highly precisely. It is therefore hard to grasp to what extent a displacement of the main mirror and sub mirror affects focus detection. Moreover, when an encoder or the like is used to sense the states of the main mirror and sub mirror, not only a halt can be detected but also a moving speed at which the main mirror and sub mirror are moved and the positions at which they halt or the positions at which they become abnormal can be detected. Nevertheless, the halt positions at which the main mirror 103 and sub mirror 107 halt cannot be detected highly precisely and directly. It is hard to grasp to what extent the displacement of the main mirror and sub mirror affects focus detection.

SUMMARY OF THE INVENTION

Accordingly, a first object of the present invention is to provide a focus detecting device capable of sensing a shift in the position of an optical member during focus detection because of an increase in the number of movements made by the optical member. The focus detecting device then senses a change in an optical length for a focus detection optical system, and properly controls actions to be performed in a camera thereafter.

A second object of the present invention is to provide a focus detecting device capable of notifying the fact that focus detection or focusing cannot be achieved normally because of a shift in the position of an optical member and a change in an optical length for a focus detection optical system. The shift in the position of an optical member shifts that occurs during focus detection and the change in the optical length for the focus detection optical system are derived from an increase in the number of movements made by the optical member.

A third object of the present invention is to provide a focus detecting device that prevents a failure in photography derived from improper focus detection or focusing. The improper focus detection or focusing is attributable to a change in an optical length for a focus detection optical system derived from an increase in the number of movements made by the optical member.

A fourth object of the present invention is to provide a focus detecting device capable of highly precisely and autonomously detecting a focus by properly correcting a deviation of an in-focus position on an image plane from an in-focus position detected by a focus detecting means despite a change in an optical length for a focus detection optical system derived from an increase in the number of movements made by a sub mirror. Herein, when the sub mirror is displaced markedly, it is judged that a camera is abnormal. A user is notified of a fear that photographic actions may not be performed normally. Furthermore, a failure in photography attributable to improper focus detection or focusing can be prevented.

According to one aspect of the present invention, there is provided a focus detecting device consisting mainly of a light receiving sensor, an optical member, a focus detection circuit, and a calculation circuit. The light receiving sensor has a plurality of photoelectric converters. The optical member is movable between a position at which the optical member lies on the path of light coming through an objective so as to route the light to the light receiving sensor, and a position at which the optical member recedes from the path of the light coming through the objective. The optical member has a member for forming light distribution in a predetermined field on the light receiving sensor. The focus detection circuit detects the focused state of the objective using a light reception signal produced by the light receiving sensor. The calculation circuit calculates a correction value, which is used for detecting the focused state, using light reception signals produced by a plurality of photoelectric converters located in the predetermined field.

Preferably, the optical member is a reflecting mirror.

Preferably, a viewfinder is included. The optical member includes a main mirror and a sub mirror. The main mirror lies on the path of light and reflects the light to the viewfinder. The sub mirror is borne by the main mirror and reflects light to the light receiving sensor.

Preferably, the member is formed on the sub mirror.

Preferably, the light receiving sensor includes a plurality of pairs of light receiving sensors. The focus detection circuit detects a correlation between light reception signals produced by one pair of light receiving sensors, and thus detects the focused state of the objective. The calculation circuit detects the correlation between the light reception signals produced by other pair of light receiving sensors so as to calculate a correction value.

Preferably, the calculation circuit calculates a plurality of correction values.

Preferably, when the number of correction values exceeds a predetermined value, the calculation circuit calculates a representative correction value in accordance with the number.

Preferably, the representative correction value is an average value of the plurality of correction values.

Preferably, a circuit is included for judging whether the correction value is within a predetermined range. If the correction value is within the predetermined range, the circuit adopts the correction value. If the correction value is out of the predetermined range, the circuit does not adopt the correction value.

Preferably, a driving means is included for driving the objective according to a signal that represents the focused state. Moreover, a prohibiting means is included for prohibiting the driving means from driving the objective when the correction value is out of the predetermined range.

Preferably, an instructing means is included for instructing warning when the correction value is out of the predetermined range.

According to another aspect of the present invention, there is provided a focus detecting device consisting mainly of a light receiving sensor, a reflecting mirror, a first detection circuit, and a focus detection circuit. The light receiving sensor has a plurality of photoelectric converters. The reflecting mirror is movable between a first position and a second position. At the first position, the reflecting mirror reflects light that comes through an objective, and routes the light to the light receiving sensor. At the second position, the reflecting mirror recedes from the path of the light coming from the objective. The reflecting mirror has a member for forming light distributions in a predetermined field on the light receiving sensor when lying at the first position. Moreover, the reflecting mirror makes a return from the first position to the second position or vice versa. The first detection circuit detects a change in the light distributions in the predetermined field on the light receiving sensor which is observed between before and after the reflecting mirror makes a return. The focus detection circuit detects the focused state of the objective by using a light reception signal produced in a field other than the predetermined field on the light receiving sensor and a detection value corresponding of the change detected by the first detection circuit.

Other features will be apparent from the drawings and description provided below.

DESCRIPTION OF THE PREFERRED EMBODIMENTS

An embodiment of the present invention will be described below.

Figure 1:
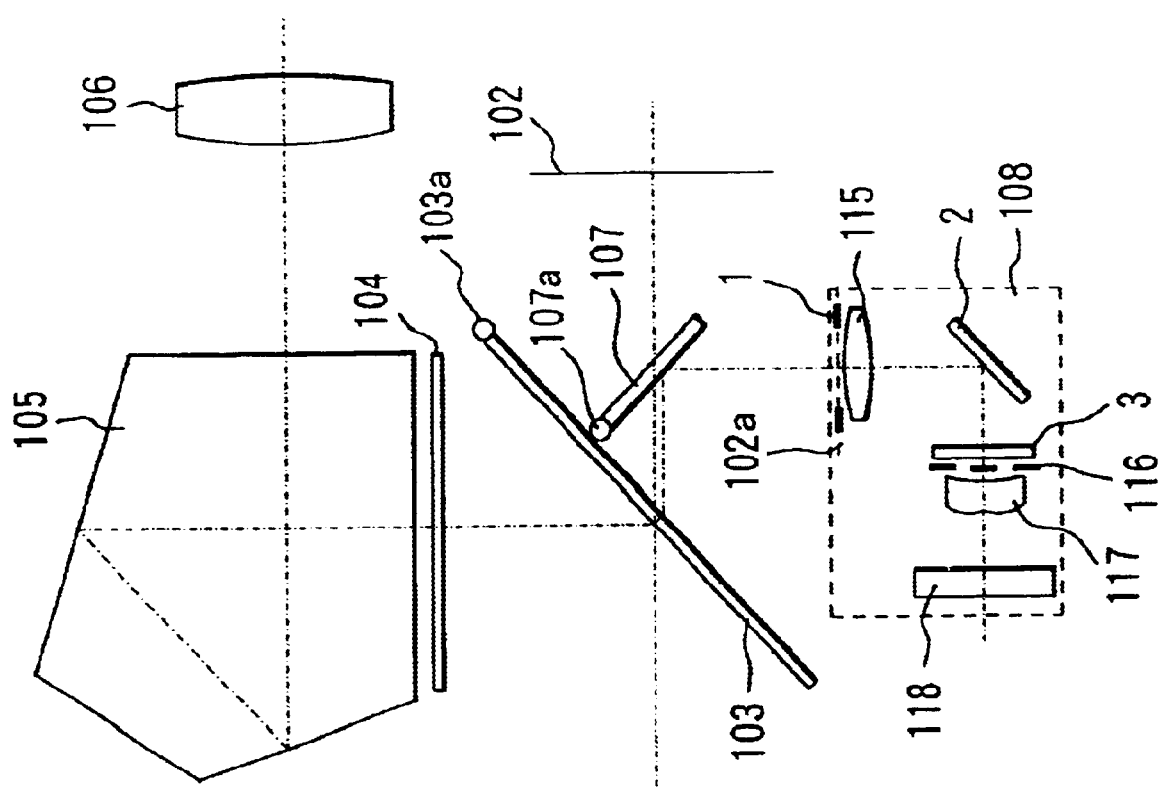
FIG. 1 is a schematic diagram showing the optical configuration of a camera in which a first embodiment of the present invention is implemented.
Figure 1:
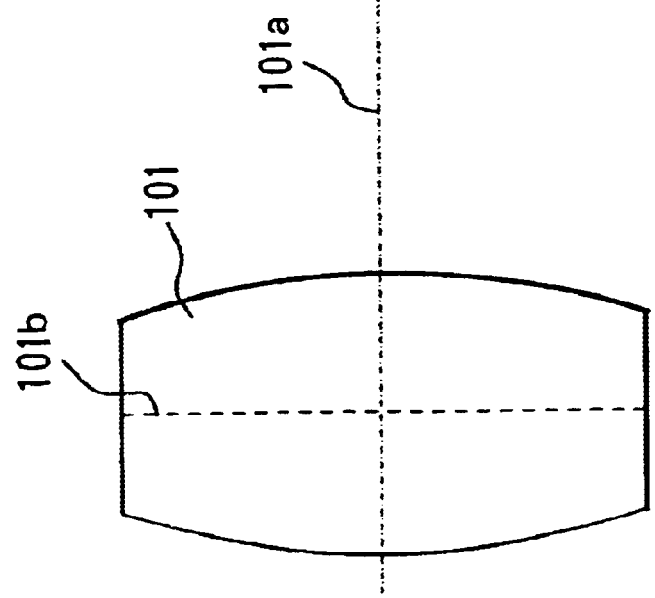
Figure 25:
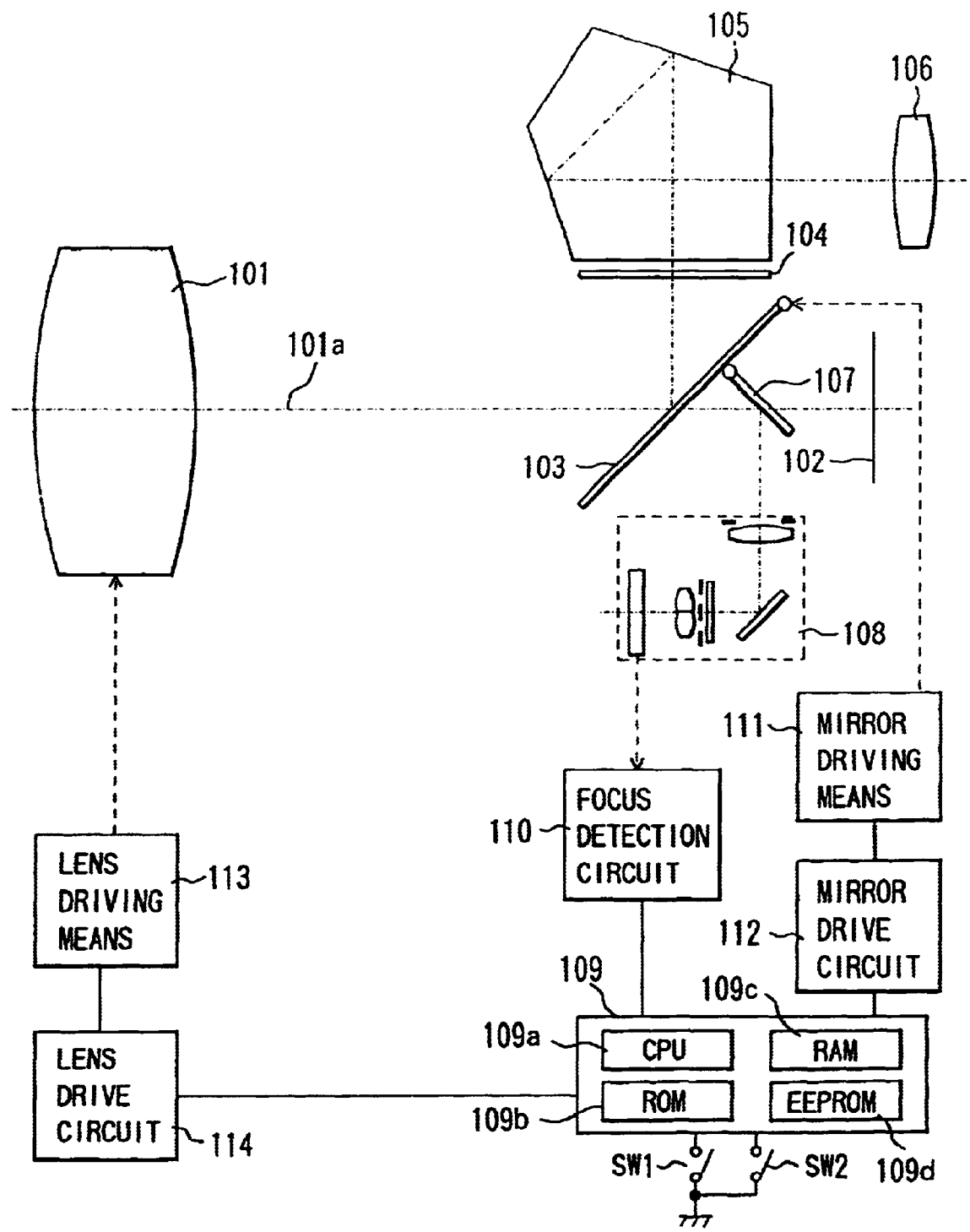
FIG. 25 is a schematic diagram showing the optical configuration and circuitry of a conventional camera.
Figure 26:
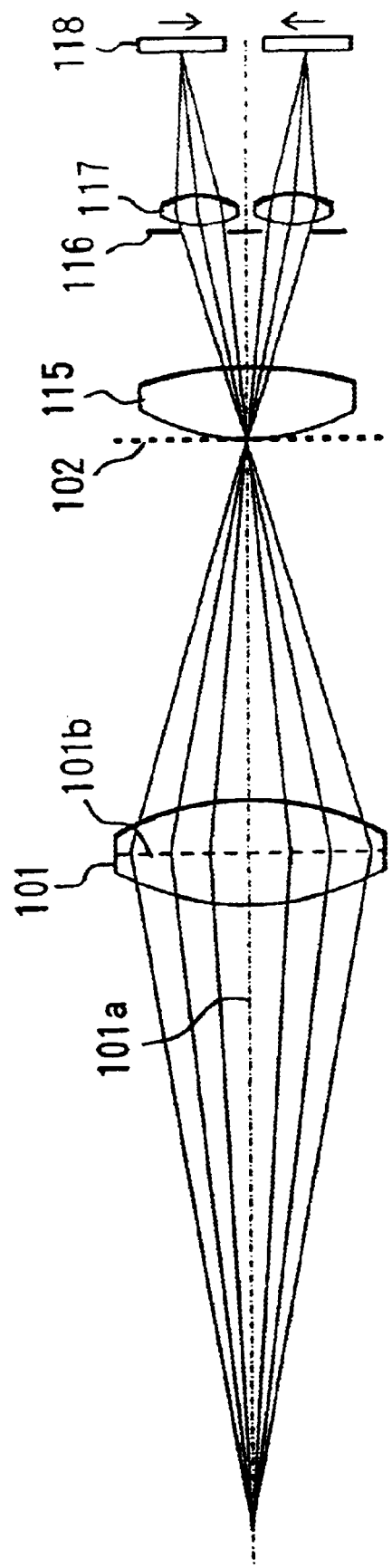
FIG. 26 shows the principles of a phase-difference (inconsistent images) method.

FIG. 1 shows the configuration of a major portion of a camera in which a first embodiment of the present invention is implemented. The same reference numerals are assigned to components having the same abilities as those shown in FIG. 25, and the description of the components will be omitted.

Referring to FIG. 1, part of light passing through a photography lens 101 is reflected upward in FIG. 1 by a main mirror 103 that has a semi-transparent part, and routed to a viewfinder optical system composed of a focusing screen 104, a pentagonal prism 105, and an eyepiece 106. On the other hand, the remaining light that has passed through the semi-transparent part of the main mirror 103 is reflected downward in FIG. 1 by a sub mirror 107, and routed to a focus detecting device 108 that adopts a known phase-difference method.

The light reflected downward from the sub mirror 107 converges on a primary image plane 102a the position of which is optically conjugate to the position of the image plane of the photography lens 101, that is, an image recording medium 102. Thereafter, the light passes through a field mask 1 and a field lens 115 that converges an exit pupil 101b of the photography lens 101 and an entrance pupil of a secondary image formation lens. The light then has its path directed leftward in FIG. 1 by a full-reflection mirror 2. Thereafter, the light passes through an infrared cut glass 3, an aperture stop 116 having a pair of apertures, and a secondary image formation lens 117 having a pair of light emitting surfaces. Consequently, a pair of object images is formed on an image sensor 118 composed of pairs of photoelectric converter trains.

The main mirror 103 pivots on a rotation shaft 103a, and has a known quick return mechanism. Therefore, the main mirror 103 stands immovably at a position shown in FIG. 1 during focus detection, while the main mirror 103 recedes from the photographic light path prior to photography. The same applies to the sub mirror 107. Moreover, the light falling surface of the secondary image formation lens 117 is made as a concave plane for fear light may be refracted forcibly. An undistorted excellent image can therefore be formed over a wide range on the image sensor 118.

Figure 2:
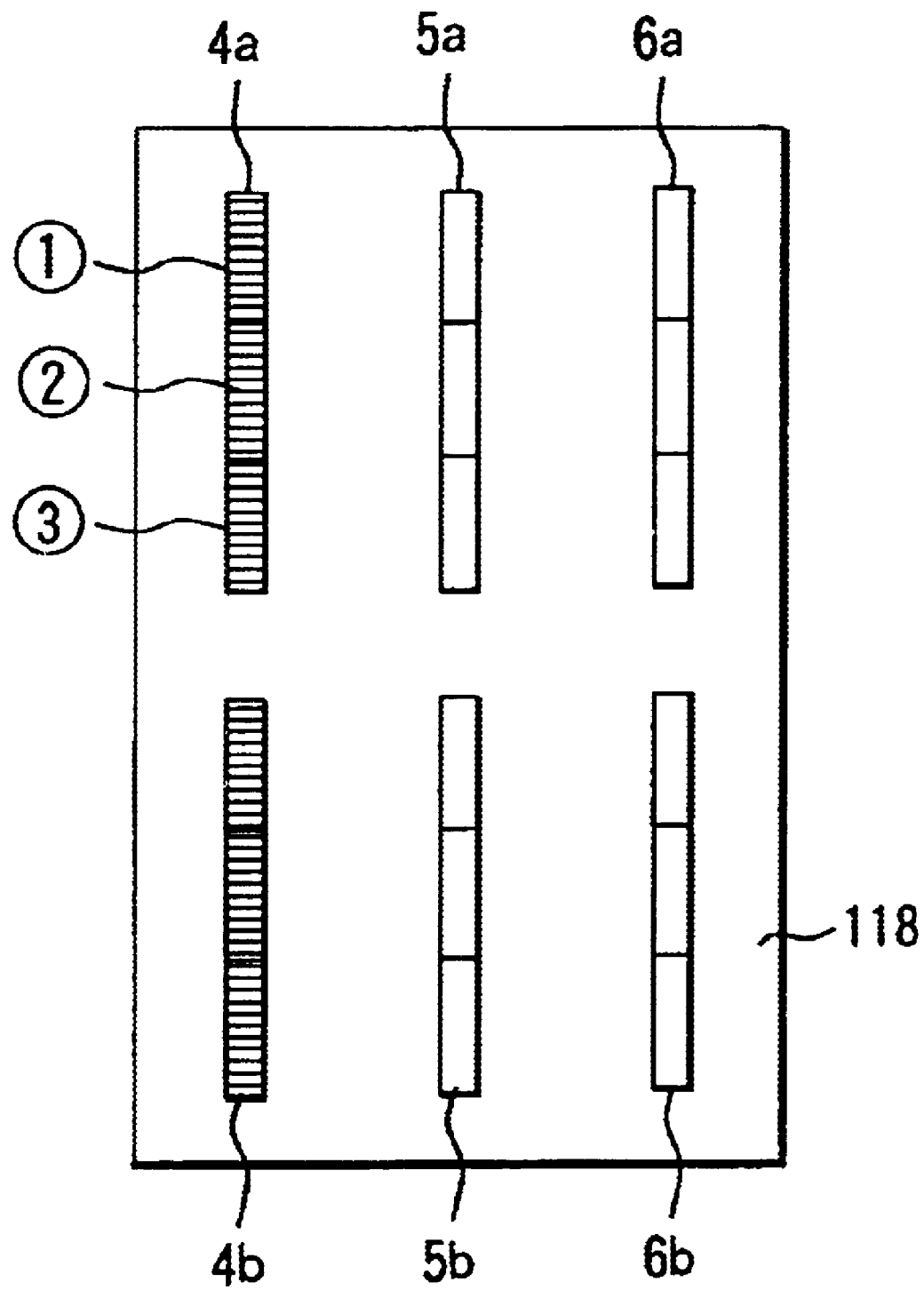
FIG. 2 schematically shows the light receiving surface of an image sensor shown in FIG. 1.

The image sensor 118 is, as shown in FIG. 2, composed of pairs of photoelectric converter trains each including a plurality of photoelectric converters, that is, pairs of photoelectric converter trains 4a and 4b, 5a and 5b, and 6a and 6b which are opposed to the pair of light emitting surfaces of the secondary image formation lens 117. The pairs of photoelectric converter trains 4a and 4b, 5a and 5b, and 6a and 6b detect light distributions that represent a pair of object images. Consequently, a known phase-difference focus detection method is implemented in order to detect the focused state of the photography lens 101.

FIG. 2 shows photoelectric converters included in the photoelectric converter trains 4a and 4b alone and associated with pixels. The other photoelectric converter trains 5a and 5b and 6a and 6b have photoelectric converters lined therein in the same manner. Moreover, the pair of photoelectric converter trains 4a and 4b is, as illustrated, divided into area portions (1), (2), and (3). The other photoelectric converter trains 5a, 5b, 6a, and 6b are also divided into the three area portions.

Figure 3:
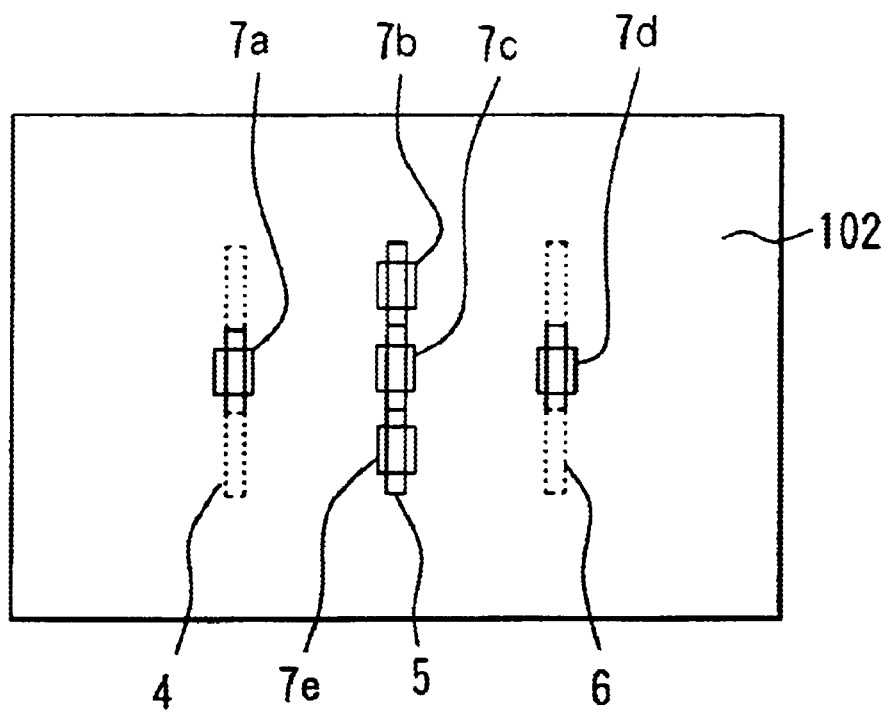
FIG. 3 shows back projections of photoelectric converter trains and focus detection frames, which are included in an image sensor, formed on an image recording medium shown in FIG. 1.

FIG. 3 shows the back projections of the pairs of photoelectric converter trains 4a and 4b, 5a and 5b, and 6a and 6b, which are included in the image sensor 118, formed on the image recording medium 102. The back projection is seen from the photography lens 101. On the image recording medium 102, the back projections of each of the pairs of photoelectric converter trains 4a and 4b, 5a and 5b, and 6a and 6b are superposed on each other and appear as a superposed back projection 4, 5, or 6. Referring to FIG. 3, back projections 7a, 7b, 7c, 7d, and 7e are back projections of focus detection frames (not shown) displayed in the view finder which are formed on the image recording medium 102.

The pairs of photoelectric converter trains 4a and 4b, 5a and 5b, and 6a and 6b are each, as mentioned above, divided into the area portions (1), (2), and (3). The superposed back projections 4, 5, and 6 are each divided into three areas corresponding to the area portions (1), (2), and (3) of the photoelectric converter trains 4a, 4b, 5a, 5b, 6a, and 6b. The areas of the superposed back projections serve as focus detection areas. The focus detection frames are coincident with the focus detection areas. When the focus detection frames are back projected on the image recording medium 102, the back projections 7a, 7b, 7c, 7d, and 7e appear, as shown in FIG. 3, to coincide with the focus detection areas.

Owing to the aforesaid components, by aligning an intended object with any of the focus detection frames in the viewfinder which appear as the back projections 7a, 7b, 7c, 7d, and 7e on the image recording medium 102, the focused state of the photography lens can be detected. Incidentally, among the focus detection areas (1), (2), and (3) of the superposed back projections 4, 5, and 6, the areas (1) and (3) of the superposed back projections 4 and 6 which are indicated with dashed lines in FIG. 3 are not used to focus the photography lens on an object in the present embodiment. In other words, the area portions (1) and (3) of the photoelectric converter trains 4a, 4b, 6a, and 6b are not used to focus the photography lens on an object.

Figure 4:
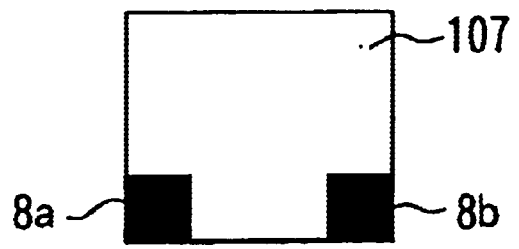
FIG. 4 shows patterns formed on the reflecting surface of a sub mirror employed in the first embodiment of the present invention.

FIG. 4 is a front view of the reflecting surface of the sub mirror 107 shown in FIG. 1 which is seen from the photography lens 101.

As illustrated, patterns 8a and 8b are inscribed on the reflecting surface of the sub mirror 107 through printing or any other technique. The patterns 8a and 8b are inscribed using a low-reflection dye of black in order to attain the lowest possible reflectance. Object images formed on the image sensor 118 are carried by light reflected from a portion of the sub mirror 107 other than the patterns 8a and 8b. Moreover, the patterns 8a and 8b inscribed on the sub mirror 107 are positioned to coincide with the area portions (3) of the pairs of photoelectric converter trains 4a and 4b, and 6a and 6b, so that the patterns can be detected in the area portions (3).

A standstill position at which the movable sub mirror 107 comes to a standstill to enable focus detection that is performed in preparation for photography may be shifted because of an increase in the number of movements made by the sub mirror 107. Even in this case, the shift represented by a focus detection signal can be corrected using a result of detection of the projections of the patterns 8a and 8b inscribed on the sub mirror 107 which are formed on the image sensor 118. This results in high-precision focus detection.

How the projections of the patterns 8a and 8b are detected in the image sensor 118 will be described below.

Figure 5:
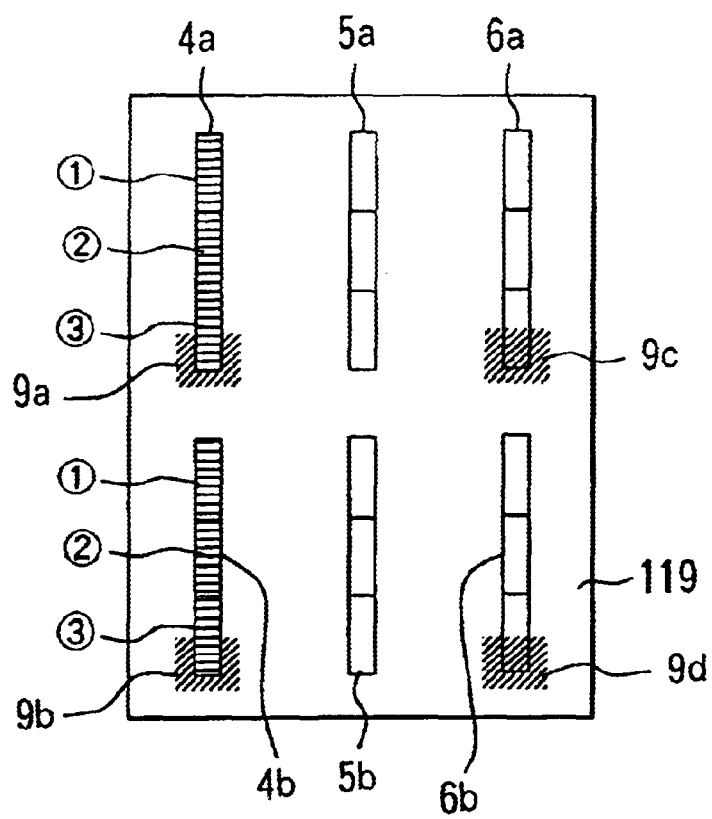
FIG. 5 shows projections of the patterns shown in FIG. 4 which are formed on the light receiving surface of the image sensor shown in FIG. 1.

FIG. 5 shows the image sensor 118 which is shown in FIG. 2 and on which the patterns 8a and 8b inscribed on the sub mirror 107 are projected in an initial state in which the standstill position of the sub mirror 107 is not shifted.

Pairs of pattern projections 9a and 9b, and 9c and 9d of the patterns 8a and 8b shown as hatched areas in FIG. 5 are formed with a predetermined distance among them over the area portions (3) of the pairs of photoelectric converter trains 4a and 4b, and 6a and 6b. In reality, since the patterns 8a and 8b on the sub mirror 107 exhibit a very low reflectance, the pattern projections do not appear on the image sensor 118. For a better understanding, the areas on the image sensor 118 coincident with the projections of the patterns 8a and 8b are shown as the hatched areas. Moreover, in reality, light that represents an image is limited by the field mask 1 shown in FIG. 1 so that light will be routed exclusively to the light receiving portions of the pairs of photoelectric converter trains 4a and 4b, 5a and 5b, and 6a and 6b on the image sensor 118 but not be routed to the other portions.

Figure 6:
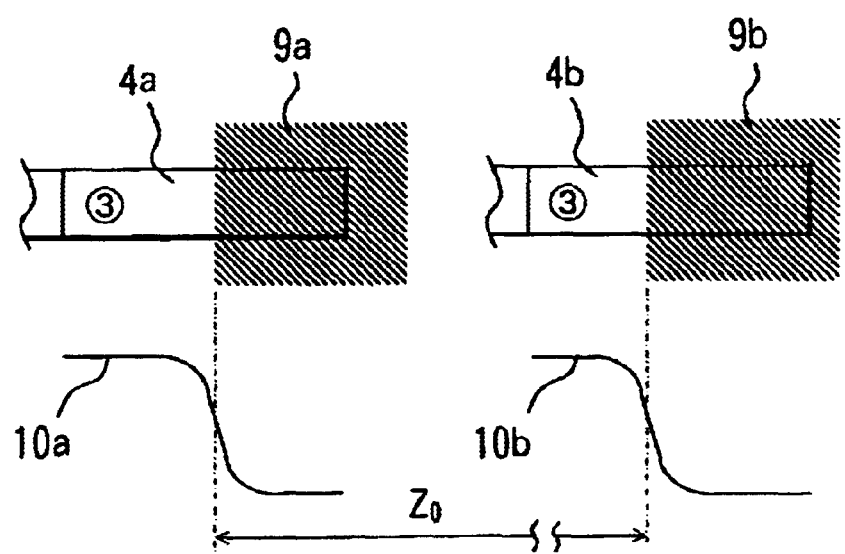
FIG. 6 shows a major portion of the image sensor shown in FIG. 5 in enlargement with the other portion omitted.

FIG. 6 shows the pattern projections 9a and 9b formed on the photoelectric converter trains 4a and 4b, which are shown in FIG. 5, and their surroundings. Similarly to FIG. 5, the photography lens 101 is focused on the image recording medium 102.

Referring to FIG. 6, projection signals 10a and 10b are produced by the photoelectric converter trains 4a and 4b according to the light distributions that represent the pattern projections. An inter-projection distance Z0 is calculated through known inter-projection distance detection that is performed based on the projection signals 10a and 10b. The pattern 8a on the sub mirror 107 is located away from the primary image plane 102. The pair of pattern projections 9a and 9b actually formed on the image sensor 118 is therefore blurred. Consequently, when an object of a homogeneous proper luminance is detected in the area portions (3) of the photoelectric converter trains 4a and 4b, the resultant projection signals 10a and 10b exhibit a waveform whose trailing edges are rather rounded.

The positions on the image sensor 118 at which the pattern projections 9a and 9b are formed are slightly deviated from the positions at which the image sensor 118 is optically conjugate to the primary image plane. However, when an object of a nearly homogeneous proper luminance is detected in the area portions (3) of the photoelectric converter trains 4a and 4b, the projection signals 10a and 10b produced by the image sensor 118 have, as shown in FIG. 6, a high-luminance component (component of a peak voltage) and a low-luminance component (component of the lowest voltage) markedly distinguished from each other. Assuming that the pattern projections 9a and 9b are separated from each other by the inter-projection distance $Z_0$, the inter-projection distance $Z_0$ can be calculated using the known inter-projection distance detection. The inter-projection distance $Z_0$ is the inter-projection distance attained in an initial state in which the standstill position of the sub mirror 107 is not shifted. The projection signals 10a and 10b produced based on the pattern projections 9a and 9b may be subjected to digital filtering in order to remove a noise component. In this case, even when the luminance of an object is rather inhomogeneous, the inter-projection distance $Z_0$ can be detected highly precisely.

Moreover, since the sub mirror 107 is interposed between the photography lens 101 and primary image plane 102a, the pattern 8a on the sub mirror 107 is unaffected by the focused state (or defocused state) of the photography lens 101. The inter-projection distance $Z_0$ remains constant irrespective of the focused state. Namely, the inter-projection distance $Z_0$ depends on a shift in the positions of an object and an optical member.

Next, a description will be made of a case where the standstill position at which the sub mirror 107 stands immovably shifts because of an increase in the number of movements.

Figure 7:
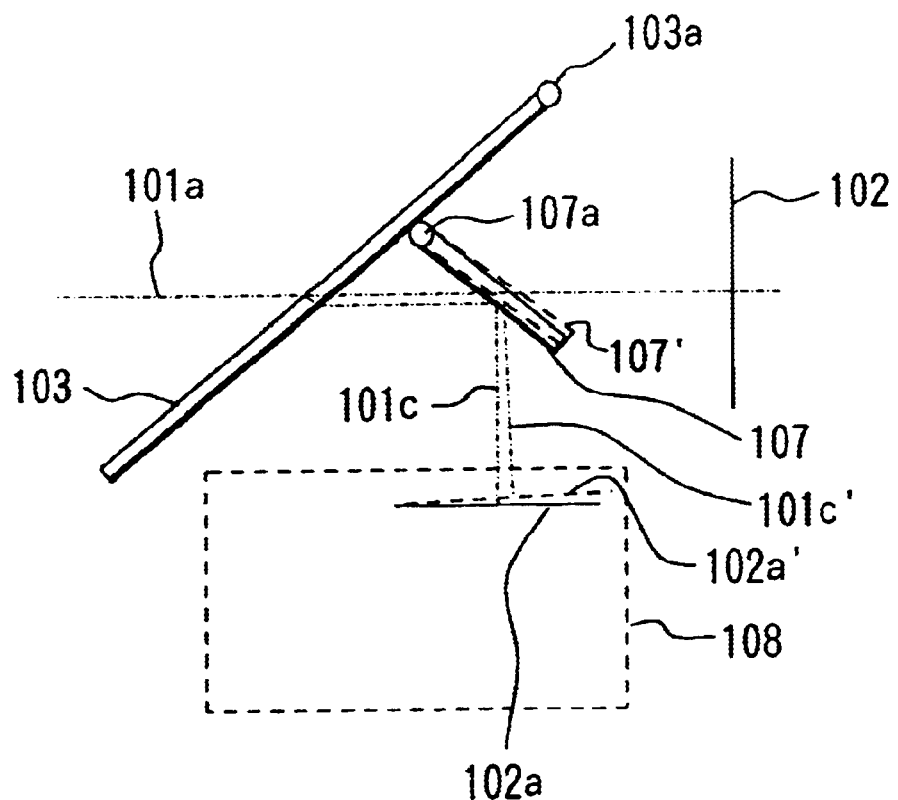
FIG. 7 shows the sub mirror shown in FIG. 1 and its surroundings in enlargement.

FIG. 7 shows in enlargement a major portion centered on the sub mirror 107 shown in FIG. 1. Components bearing the same reference numerals as those shown in FIG. 1 have the same abilities as those shown in FIG. 1, and the description of the components will be omitted.

The number of movements made by the main mirror 103 and sub mirror 107 increases with the repeated use of a camera for photography. In due course, the standstill positions at which the main mirror 103 and sub mirror 107 stand immovably shift because the members constituting a mechanism for moving the mirrors are worn down or fatigued.

For example, as shown in FIG. 7, assume that the standstill position of the sub mirror 107 is shifted to a position 107' indicated with a dashed line with a rotation shaft 107a as a fulcrum. Incidentally, a shift in the standstill position of the main mirror 103 derived from an increase in the number of movements made by the main mirror affects the focus detecting device 108 less than a shift in the standstill position of the sub mirror 107 does. The shift in the standstill position of the main mirror 103 is therefore not taken into consideration.

When the standstill position of the sub mirror 107 is not shifted, that is, in an initial state, the ray axis 101a of light emanating from the photography lens 101 leads to a ray axis 101c because the light passing through the main mirror 103 changes its direction downward in FIG. 7 while being reflected from the sub mirror 107. The light is then routed to the focus detecting device 108. In contrast, when the standstill position of the sub mirror 107 is shifted to the position 107' indicated with a dashed line in FIG. 7, the ray axis 101a of light emanating from the photography lens 101 leads to a ray axis 101c' because the light passing through the main mirror 103 has its path changed while being reflected from the sub mirror 107'. Consequently, the primary image plane 102a is inclined while being displaced rightward and upward and located at a position 102a' indicated with a dashed line in FIG. 7

Figure 8:
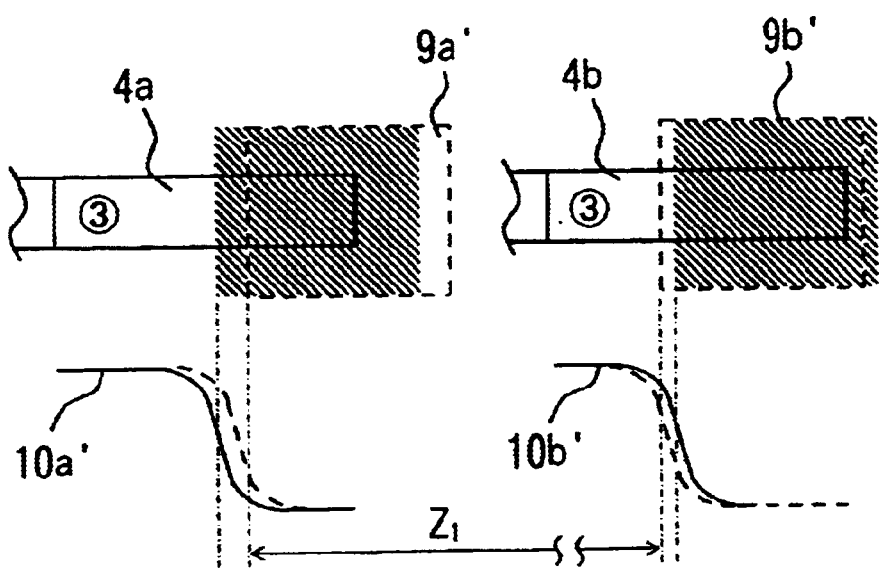
FIG. 8 shows a major portion of the image sensor shown in FIG. 5 in enlargement with the other portion omitted.

FIG. 8 is an enlarged view similar to FIG. 6, showing the projections of the pattern 8a formed on the image sensor 118 after the sub mirror 107 is displaced to lie at the standstill position 107' in FIG. 7. Similarly to FIG. 5 and FIG. 6, the photography lens 101 is focused on the image recording medium 102. Moreover, components bearing the same reference numerals have the same abilities as those shown in the drawing referred to previously.

As shown in FIG. 7, the primary image plane 102 is displaced to lie at the position 102a', and thus moved toward the photography lens 101. This means that an optical length over a path from the primary image plane to the image sensor 118 gets larger. The pair of pattern projections 9a and 9b are therefore moved to reduce an inter-projection distance between them and formed as pattern projections 9a' and 9b' indicated with dashed lines in FIG. 8. Strictly speaking, distances by which the pattern projections 9a and 9b are moved are different from each other. The projection signals 10a and 10b produced by the image sensor 118 have their waveform changed to be image signals 10a' and 10b' indicated with dashed lines in FIG. 8. An inter-projection distance $Z_1$ attained after the standstill position of the sub mirror 107 is shifted is then calculated through the known inter-projection distance detection.

Using the inter-projection distance $Z_0$ attained in the initial state and the inter-projection distance $Z_1$ attained after the standstill position of the sub mirror 107 is shifted, a deviation of the inter-projection distance $Z_1$ from the inter-projection distance $Z_0$, $\Delta Z_1$, is calculated according to an expression (1).

$$\Delta Z_1 = Z_1 - Z_0 \tag{1}$$

The deviation $\Delta Z_1$ of the inter-projection distance $Z_1$ is reflected on a degree of focusing to which the photography lens 101 is focused. Consequently, even when the standstill position of the sub mirror 107 is shifted, focus detection can be achieved highly precisely.

The pattern 8a on the sub mirror 107 has been described so far. The same applies to the pattern 8b, and the above description will therefore not be repeated in relation to the pattern 8b.

Next, actual actions to be performed in relation to correction of a focus detection signal will be described below.

Figure 9:
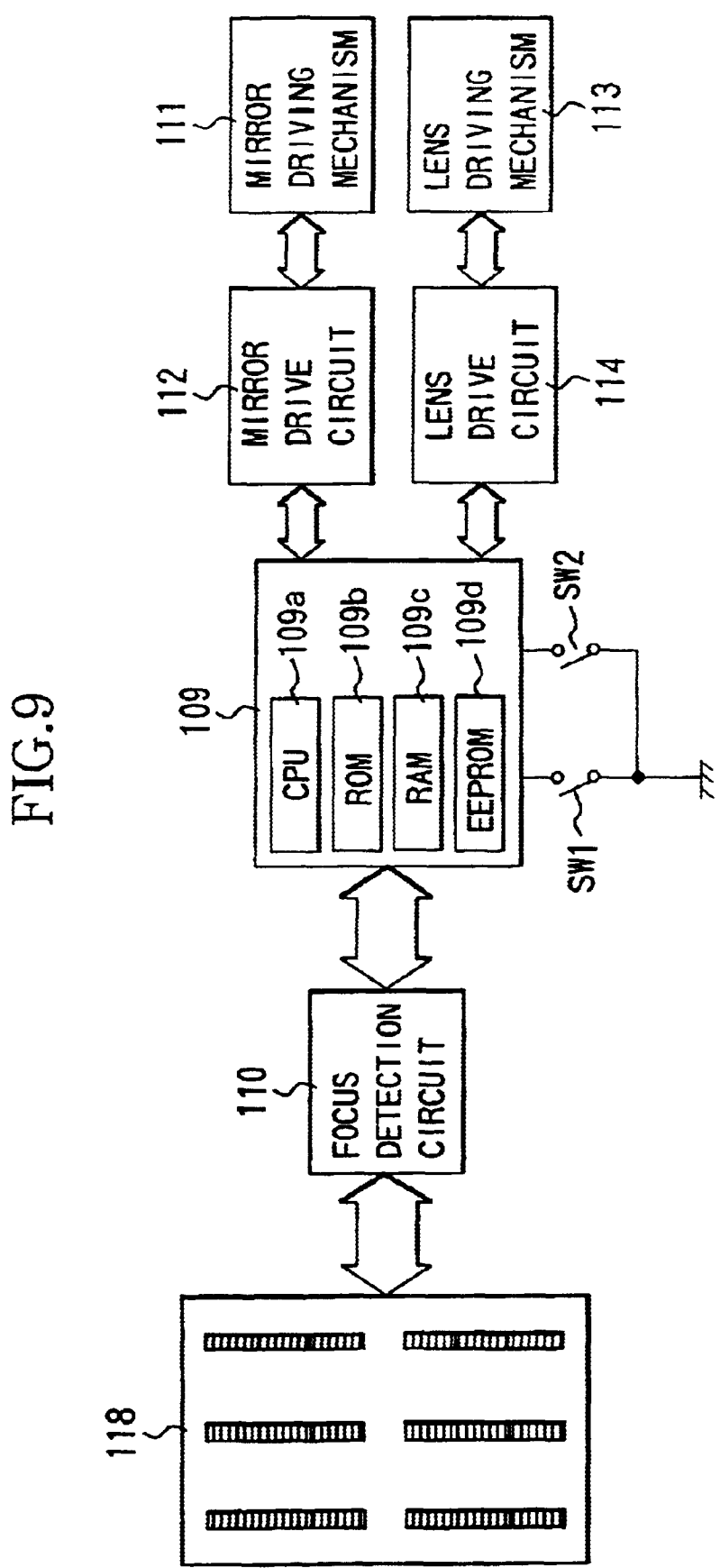
FIG. 9 is a block diagram showing the circuitry of the camera in which the first embodiment of the present invention is implemented.

FIG. 9 is a block diagram showing the circuitry of the camera in which the present embodiment is implemented. The same reference numerals are assigned to components having the same abilities as those shown in the drawings referred to previously.

A focus detection circuit 110 is connected to the image sensor 118. The focus detection circuit 110 is connected to a microcomputer 109 that is a processing unit. The microcomputer 109 designates a light receiving portion of the image sensor 118 and controls accumulation of photoelectric charge. The microcomputer 109 consists mainly of a central processing unit (CPU) 109a, a ROM 109b, a RAM 109c, and an electrically erasable programmable ROM (EEPROM) 109d. The microcomputer 109 executes focus detection according to a program stored in the ROM 109b.

Moreover, optical information concerning a focus detection optical system is stored in advance in the EEPROM 109d at an adjustment step in the process of manufacturing. Furthermore, a switch SW1 and a switch SW2 are connected to the microcomputer 109. The switch SW1 is turned on when a photographer gives a first stroke to a release button. The switch SW2 is turned on with a second stroke is given to the release button. Moreover, a mirror drive circuit 112 and a lens drive circuit 114 are connected to the microcomputer 109. The mirror drive circuit 112 drives a mirror driving mechanism 111 that causes the main mirror 103 and sub mirror 107 to recede from the photographic light path in preparation for photography. The lens drive circuit 114 drives a lens driving mechanism 113 that moves a focus lens array, which is not shown and included in the photography lens 101, according to the detected focused state of the photography lens.

Next, actions to be performed by the microcomputer 109 that follows a focus detection program stored in the ROM 109b will be described in conjunction with the flowchart of FIGS. 10(A), (B).

First, it is judged at step #101 whether a photographer has pressed the release button to turn on the switch SW1. If the switch SW1 is turned on, control is passed to step #102. At step #102, it is started to accumulate photoelectric charge in the area portions of the image sensor 118 associated with at least one selected focus detection frame. Accumulated charges are then read as a pair of projection signals and stored in the RAM 109c. At step #103, it is judged whether the projection signals are reliable. If the reliability does not meet a predetermined condition, it is judged that focus detection is disabled. Control is then passed to step #104 at which focus detection disabled-time processing is carried out.

In contrast, if the reliability of the projection signals meets the predetermined condition, control is passed from step #103 to step #105. After the pair of projection signals is corrected by resolving aberration caused by the focus detection optical system, arithmetic operations are performed as digital filtering in order to remove a specific frequency component. At step #106, known inter-projection distance detection is performed on the pair of projection signals in order to calculate as a difference between the inter-projection distance attained when the photography lens is in focus and a current inter-projection distance so as to thus obtain a displacement of current projections with the projections formed when the photography lens is in focus (a degree of defocusing). The inter-projection distance attained when the photography lens is in focus is different among the focus detection areas described in conjunction with FIG. 3. The inter-projection distances observed in the respective focus detection areas when the photography lens is in focus are stored in the EEPROM 109d. Thereafter, various kinds of correction including correction of an inter-projection distance affected by temperature are carried out. Based on the degree of defocusing observed in a selected focus detection area coincident with a focus detection frame, a degree of focusing to which the photography lens 101 is focused is calculated.

At step #107, an a driving amount to which the focus lens array that is not shown and that is included in the photography lens 101 is driven is calculated from the calculated degree of focusing. The lens driving mechanism 113 is driven by the calculated driving amount by means of the lens drive circuit 114. Consequently, the photography lens 101 is focused. At step #108, the focused state of the driven photography lens is within the range of in-focus states. If the focused state is within the range of in-focus states, control is passed to step #109. In contrast, if it is judged that the focused state is out of the range of in-focus states, control is returned to step #102 of focus detection.

At step #109, photoelectric charges accumulated in the area portions (3) of the pairs of photoelectric converter trains 4a and 4b, and 6a and 6b on the image sensor 118 are read as pairs of projection signals and stored in the RAM 109. The patterns 8a and 8b are projected on the area portions (3) as shown in FIG. 4 and FIG. 5. Pairs of projection signals concerning the patterns 8a and 8b are stored in the RAM 109. At step #110, it is judged whether the pairs of projection signals are reliable. If the reliability of one of the pairs of projection signals or the reliabilities of both thereof meet a predetermined condition, control is passed to step #111. If the reliability or reliabilities do not meet the predetermined condition, control is jumped to step #116, and focus detection is terminated.

One of conceivable methods of judging whether the projection signals are reliable is, as described in conjunction with FIG. 5, to store projection signals, which are acquired from the projections of the patterns 8a and 8b when an object of a proper luminance is imaged, in the EEPROM 109d in advance in the process of manufacturing. A degree of correlation between projection signals read from the EEPROM 109d and projection signals acquired during focus detection is calculated for the judgment.

If the reliabilities of the projection signals meet the predetermined condition, control is passed to step #111. At this time, each of the pairs of projection signals is corrected by resolving aberration caused by the focus detection optical system, and then subjected to digital filtering for which arithmetic operations are performed in order to remove a specific frequency component. At step #112, the pair of projection signals whose reliability is judged to meet the predetermined condition is subjected to known inter-projection distance detection. Thus, an inter-projection distance is calculated. Thereafter, a deviation of the inter-projection distance from an inter-projection distance attained in the initial state and stored in the EEPROM 109a in the process of manufacturing is calculated according to the expression (1). The number of times of detection is calculated at the same time. What is referred to as the number of times of detection signifies the number of times of detection performed up to the present. Noted is that when the reliability of one pair of projection signals is judged to meet the predetermined condition at step #110, the detection of the focus is counted as one time of detection. When control is passed from step #112, the number of times of detection is incremented by one.

Now, assume that a deviation of the inter-projection distance between the projections of the pattern 8a which is calculated at the n-th time of detection from a stored value is $\Delta Z_{an}$, and a deviation of the inter-projection distance between the projections of the pattern 8b from a stored value is $\Delta Z_{bn}$. A representative deviation of an inter-projection distance, $\Delta Z_n$, is calculated according to an expression (2) below.

$$\Delta Z_n = (\Delta Z_{an} + \Delta Z_{bn})/2 \qquad (2)$$

When the reliability of one pair of projection signals is judged not to meet the predetermined condition at step #110, only one of the deviation of the inter-projection distance, $\Delta Z_{an}$, and the deviation of the inter-projection distance, $\Delta Z_{bn}$, is calculated. In this case, the calculated deviation of an inter-projection distance is adopted as the representative deviation of an inter-projection distance, $\Delta Z_n$, but the expression (2) is not solved.

At step #113, the typical deviation of an inter-projection distance, $\Delta Z_n$, and the number of times of detection, n, are stored in the EEPROM 109d. At step #114, it is judged whether the number of times of detection, n, is equal to or larger than a threshold m. If the number of times of detection is equal to or larger than the threshold m (the number of times of detection at this time may be denoted by m), control is passed to step #115 of calculation of a correction value. If the number of times of detection is smaller than the threshold m, control is passed to step #118. The reason why the threshold m is employed is to remove influence of a minute difference of the standstill position of the sub mirror 107 from the one attained after a previous movement or influence of a difference of a focus detection signal from object to object. Since a plurality of results of focus detection is used for correction, high-precision focus detection is realized.

At step #115, a correction value for an inter-projection distance, $\Delta Z_c$, is drawn out from a plurality of representative deviations of inter-projection distances, $\Delta Z_1$, $\Delta Z_2$, etc., and $\Delta Z_m$ that are stored in the EEPROM 109d at step #113. Namely, the correction value for an inter-projection distance, $\Delta Z_c$, is calculated by averaging the plurality of representative deviations of inter-projection distances, $\Delta Z_1$, $\Delta Z_2$, etc., $\Delta Z_n$, etc., and $\Delta Z_m$, that is, according to an expression (3) below.

$$\Delta Z_c = (\Delta Z_1, \Delta Z_2, \text{etc.}, \Delta Z_n, \text{etc.}, \text{and } \Delta Z_m)/m \tag{3}$$

At step #116, it is judged whether the correction value for an inter-projection distance, $\Delta Z_c$, is within a predetermined range. A judgment routine to be run this time will be detailed later. If it is judged that the correction value for an inter-projection distance, $\Delta Z_c$, is within the predetermined range (it means that the camera is OK), control is passed to step #117. In contrast, if it is judged that the correction value for an inter-projection distance, $\Delta Z_c$, is out of the predetermined range (it means that the camera is no good (NG)), control is passed to step #121. A routine for notifying a user of the fact that the camera is abnormal is run.

At step #117, the correction value for an inter-projection distance, $\Delta Z_c$, is multiplied by a coefficient associated with each focus detection area, and a correction value for an inter-projection distance specific to a focus detection area is thus calculated. For example, assuming that a coefficient associated with a focus detection area coincident with the focus detection frame 7a shown in FIG. 3 is $C_{FP1}$, the correction value for an inter-projection distance specific to a focus detection area, $\Delta Z_{FP1C}$, is calculated according to an expression (4) below. By the way, in reality, the focus detection frames 7a to 7d shown in FIG. 3 are the projections of the actual focus detection frames. For brevity's sake, the projections of the actual focus detection frames may be termed the focus detection frames.

$$\Delta Z_{FP1C} = C_{FP1} \times \Delta Z_c \tag{4}$$

As mentioned above, the correction value for an inter-projection distance, $\Delta Z_c$, is multiplied by the coefficient $C_{FP}$ associated with a focus detection area. This is because supposing the standstill position of the sub mirror 107 shifts with the rotation shaft 107a of the sub mirror as a center, a change in an optical length for the focus detection optical system varies depending on a point on the sub mirror from which light is reflected. The inter-projection distance that is attained in the initial state and that is stored in the EEPROM 109d in advance is corrected based on the correction value for an inter-projection distance specific to a focus detection area, $\Delta Z_{FP1C}$. The number of times of detection stored at step #113 is reset to 0.

Now, an inter-projection distance observed in a focus detection area coincident with the focus detection frame 7a, which is attained in the initial state, shall be $Z_{FP1}$. The inter-projection distance $Z_{FP1}$ is provided as an expression (5) below. According to the expression (5), an inter-projection distance that is detected during the next focus detection and derived from a shift in the standstill position of the sub mirror 107 is calculated with a deviation from a stored value corrected.

$$Z_{FP1} = Z_{FP1} + \Delta Z_{FP1C} \tag{5}$$

Likewise, a deviation of an inter-projection distance observed in a focus detection area coincident with any of the other focus detection frames 7b to 7e is corrected. Moreover, the coefficient $C_{FP1}$ associated with a focus detection area is a constant inferred from a result of an experiment of measuring a shift in the standstill position of the sub mirror 107 derived from an increase in the number of movements made by the sub mirror 107, and is therefore determined in advance.

At step #118, it is judged whether a photographer has turned on the switch SW2 by giving a second stroke to the release button. If the switch SW2 is turned on, control is passed to step #119. The mirror drive circuit 112 then drives the mirror driving mechanism 111. Consequently, the main mirror 103 and sub mirror 107 are caused to recede from the photographic light path. A shutter that is not shown is opened and closed in order to perform photography. A series of actions is then terminated.

If it is judged at step #118 that the switch SW2 is not turned on, control is passed to step #120. It is then judged whether the switch SW1 is on or off. If the switch SW1 remains on, control is passed to step #118. If the switch SW1 remains off, control is returned to the start step of step #101.

Figure 11:
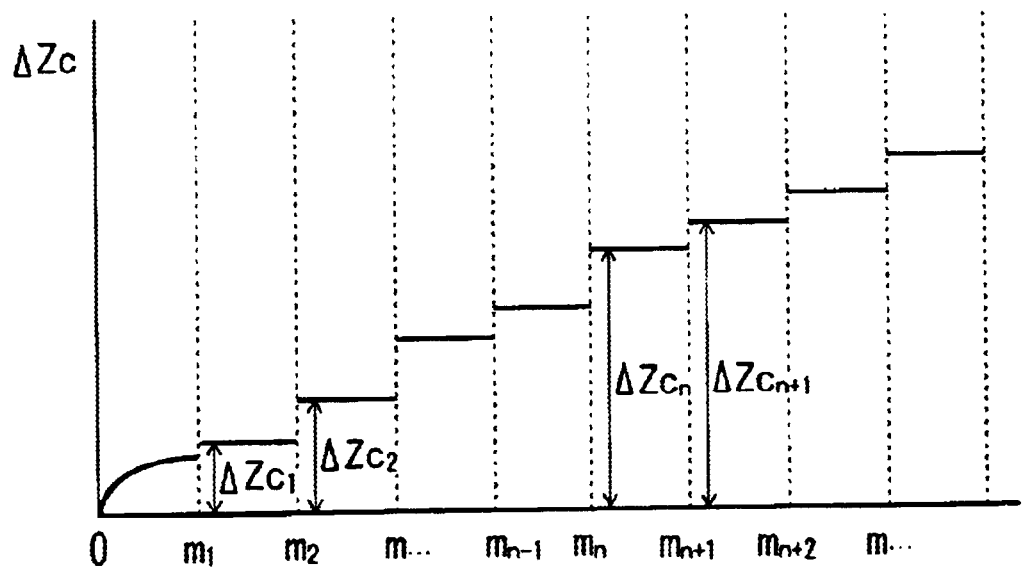
FIG. 11 shows a correction value by which an inter-projection distance is corrected and which is employed in the first embodiment of the present invention.

FIG. 11 is a graph indicating the aforesaid correction value for an inter-projection distance, $\Delta Z_c$. Herein, the correction value for an inter-projection distance, $\Delta Z_c$, is updated with every increment of the number of times of detection, m. The correction value for an inter-projection distance, $\Delta Z_c$, is, as mentioned above, an average of the representative deviations of inter-projection distances, $\Delta Z_n$.

From the first or 0-th time to the $m_1$-$t_h$ time of detection, since the representative deviation of an inter-projection distance, $\Delta Z_n$, is not stored in a memory, an inter-projection distance is not corrected. As described in conjunction with the related art, the relationship between the number of movements made by an optical member (sub mirror) and a correction value for a focus detection signal is stored in a memory, and the correction value is reflected on the inter-projection distance.

From the $m_1$-$t_h$ time to the $m_2$-$t_h$ time of detection, a correction value for an inter-projection distance, $\Delta Z_{c1}$, calculated from the results of the 0-th to $m_1$-$t_h$ times of detection is used to calculate a correction value for an inter-projection distance specific to each focus detection area. Thus, the focus detection optical system is corrected.

Thereafter, from the $m_n$-$t_h$ time to $m_{n+1}$-$t_h$ time of detection, a correction value for an inter-projection distance, $\Delta Z_{cn}$, calculated from the results of the $m_{n-1}$-$t_h$ time to $m_n$-$t_h$ time of detection is used to calculate a correction value for an inter-projection distance specific to each focus detection area. The focus detection optical system is thus corrected.

As mentioned above, a rotation supporting member and a member for restricting the standstill position of the sub mirror 107 are worn down with an increase in the number of movements made by the sub mirror 107. This causes the standstill position of the sub mirror 107 to shift. Moreover, an optical length for the focus detection optical system changes, whereby the in-focus position of the photography lens 101 deviates from an in-focus position arithmetically obtained through focus detection. Nevertheless, a result of focus detection can be corrected based on a result of detection performed to detect a deviation of an inter-projection distance between the projections of each of the patterns 8a and 8b drawn on the sub mirror 107 from a stored value. Consequently, high-precision focus detection can be achieved while being unaffected by the number of movements made by the optical member included in the focus detection optical system. Moreover, the inter-projection distance between the projections of each of the patterns 8a and 8b is detected after the photography lens 101 is brought into focus Therefore, a focusing speed will not be lowered.

The present embodiment has been described by taking a phase-difference type focus detecting device for instance. The present embodiment can also be adapted to a contrast (blur) detection type focus detecting device. In this case, the displacement of the projections of a pattern from the projections thereof formed in the initial state is detected, and a result of focus detection is corrected based on the result of the detection.

Next, the judgment routine of the step #116 will be described in conjunction with FIG. 12.

As described in relation to the related art, a standard correction value for an inter-projection distance, $\Delta Z_{cst}$, is calculated using experimentally obtained data and stored in a memory in association with the number of movements made by the main mirror and sub mirror.

A maximum permissible correction value $\Delta Z_{cmax}$ is set relative to the standard correction value for an inter-projection distance $\Delta Z_{cst}$. If the correction value for an inter-projection distance $\Delta Z_c$ is larger than the maximum permissible correction value $\Delta Z_{cmax}$, it is judged that the position of the sub mirror is abnormal. Likewise, a minimum permission correction value $\Delta Z_{cmin}$ is set relative to the standard correction value for an inter-projection distance $\Delta Z_{cst}$. If the correction value for an inter-projection distance $\Delta Z_c$ is smaller than the minimum permission correction value $\Delta Z_{cmin}$, it is judged that the position of the sub mirror is abnormal.

The above values are determined based on experimentally acquired data. As long as the camera operates normally, it is judged that the values will not be exceeded. However, consideration must be taken into differences of one member or the like from another in terms of various factors.

Figure 12:
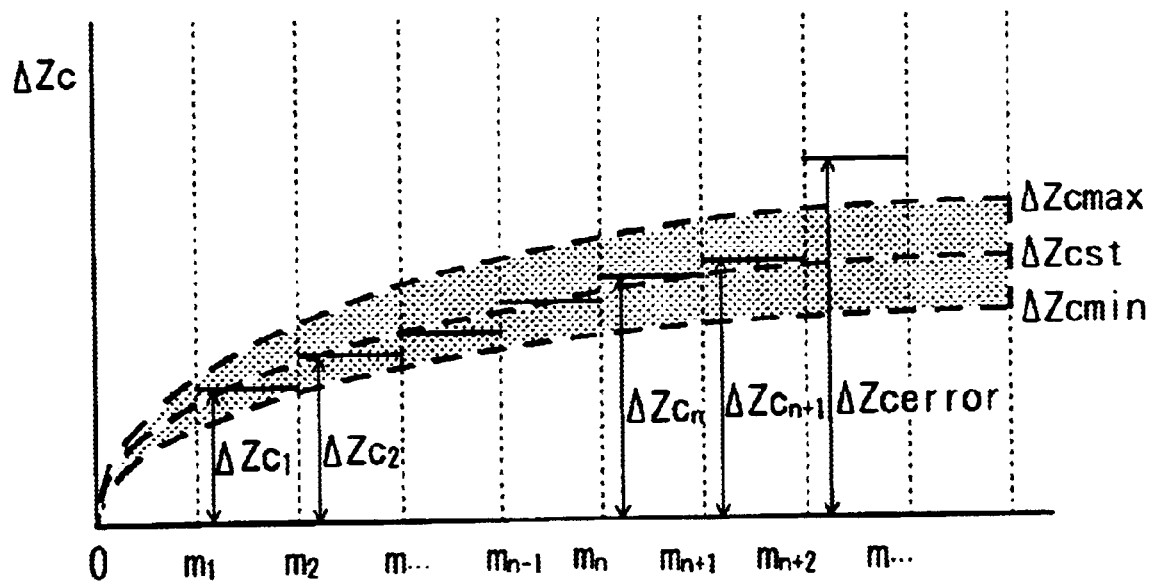
FIG. 12 shows a correction value by which an inter-projection distance is corrected and which is employed in the first embodiment of the present invention.

Referring to FIG. 12, as long as the correction value for an inter-projection distance, $\Delta Z_c$, does not exceed a value $\Delta Z_{cn+1}$, the position of the sub mirror is not abnormal. It is therefore judged that the camera operates normally. Control is therefore passed from step #116 in FIG. 10 to step #117.

However, a value $\Delta Z_{cerror}$ exceeds the maximum permissible correction value $\Delta Z_{cmax}$. Therefore, if the correction value for an inter-projection distance, $\Delta Z_c$, assumes the value $\Delta Z_{cerror}$, it is judged that the camera operates abnormally.

Figure 10:
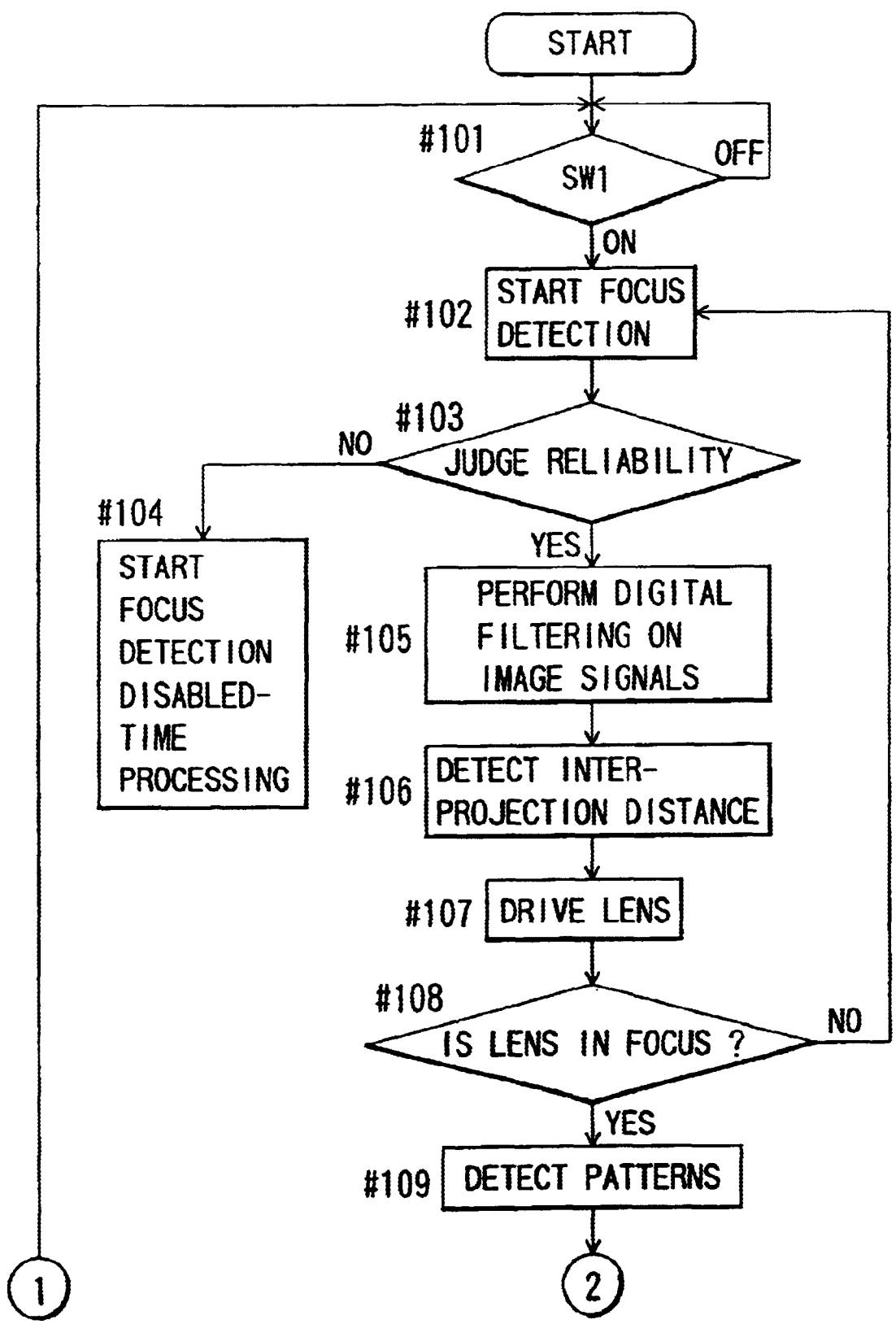
FIGS. 10(A), (B) are flowchart describing actions to be performed by a major portion of the camera in which the first embodiment of the present invention is implemented.
Figure 10:
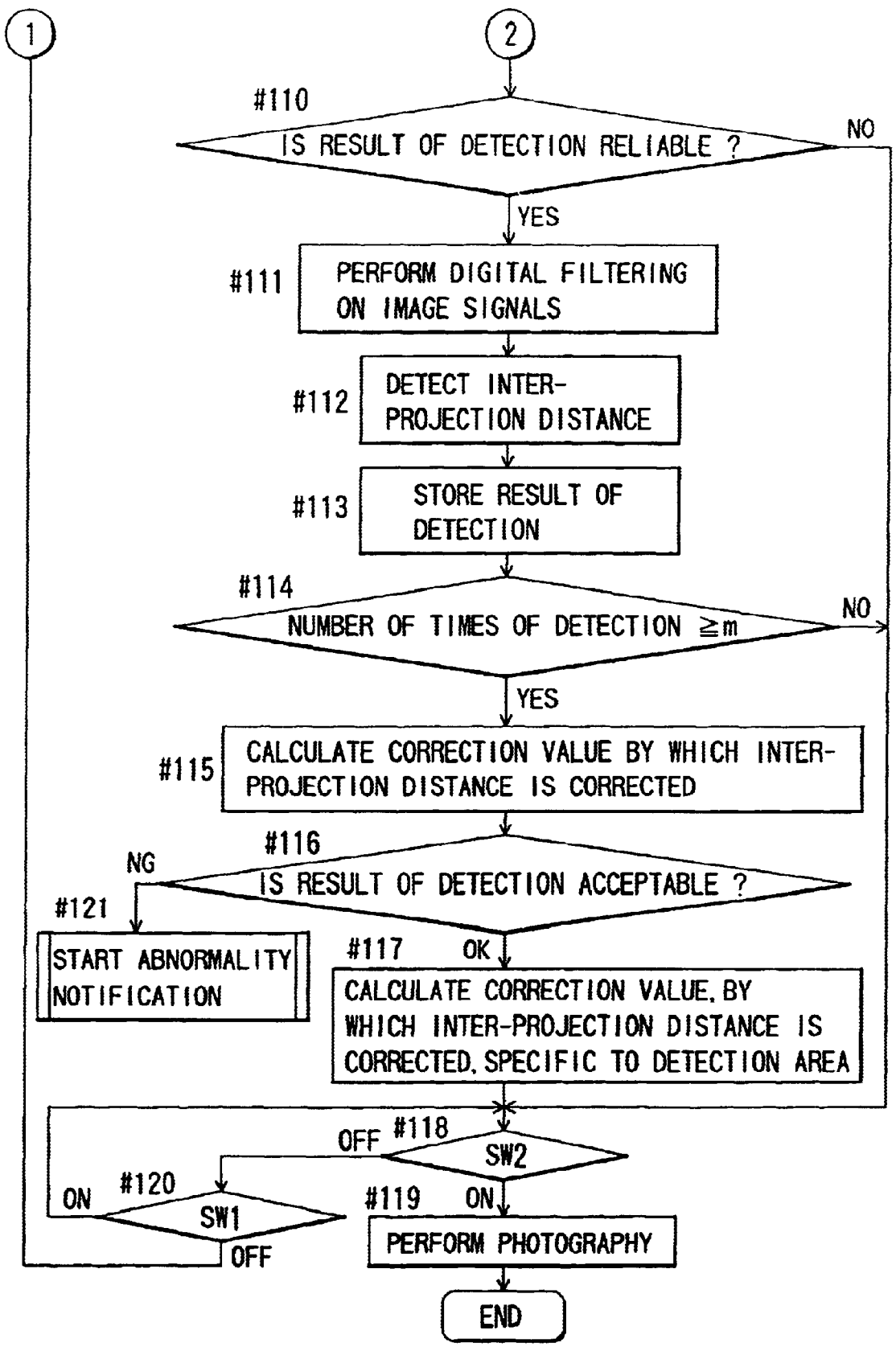

Control is therefore passed from step #116 in FIG. 10 to step #121. It is then presumed that the position of the sub mirror has shifted greatly. During an abnormality notification routine of step #121, the camera is stopped operating, and an error indication is displayed on an external liquid crystal display device of the camera.

Figure 13:
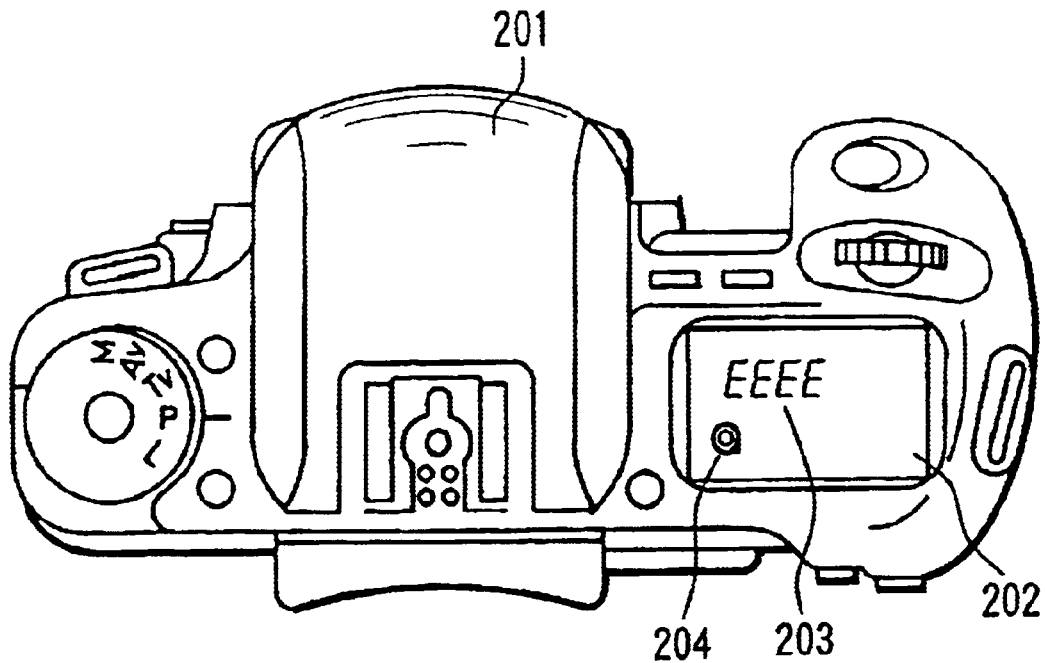
FIG. 13 is a top view of the camera in which the first embodiment of the present invention is implemented.

FIG. 13 is a top view of the camera in which an example of the first embodiment of the present invention is implemented, wherein the camera is notifying a user of occurrence of an abnormality (a mounted lens is not shown).

In FIG. 13, there are shown a camera 201 and an external liquid crystal display unit 202. A display 203 is included in the external liquid crystal display unit 202, and informs a user of occurrence of an abnormality. Normally, a seven-segment display is adopted as the display 203 and presents photographic information or the like. A Patrone mark 204 indicates that a film is loaded.

In this state, the camera prohibits the movements of the components thereof for fear a user may proceed with photography carelessly.

In this example, if any abnormality occurs, if the position of the sub mirror is presumably shifted largely, it is prohibited to move any component of the camera. Any manipulation performed on the camera is not accepted. However, if all the features of the camera do not work, in case of emergency or in case photography to be performed using a distance-to-lens indicator or the like is acceptable, a drawback may arise.

Figure 14:
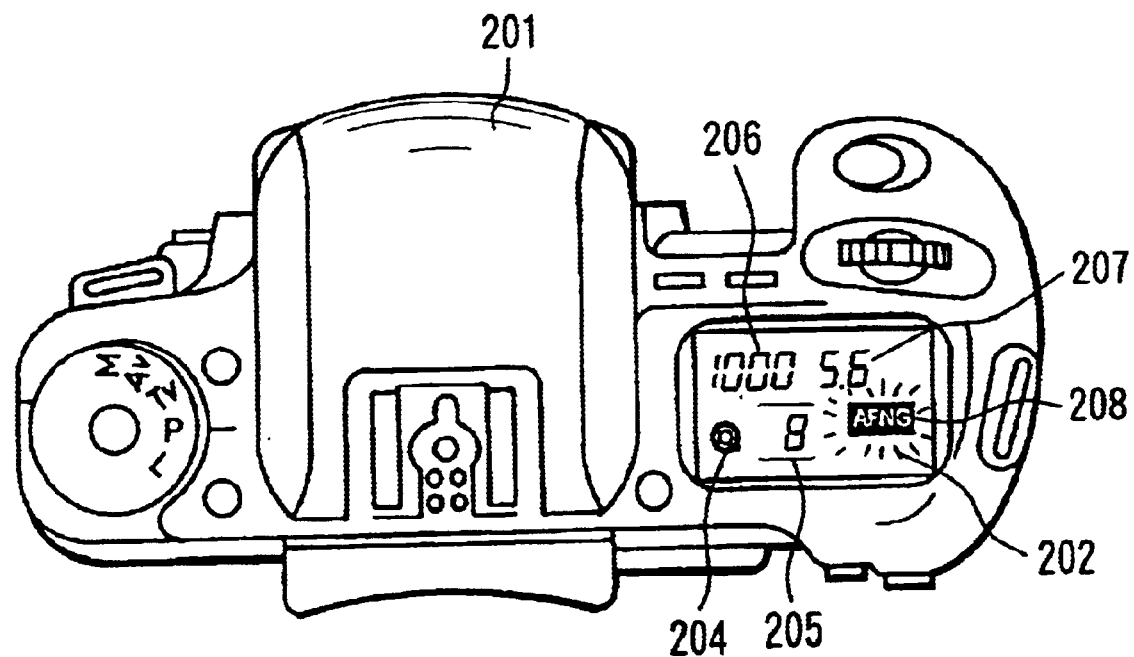
FIG. 14 is a top view of another camera in which the present invention is implemented.

According to this example of the first embodiment of the present invention, as shown in FIG. 14, the movement of only the mechanism involved in an action of focus detection out of all the photographic actions performed in a camera is prohibited. The movements involved in the other photographic actions are achieved as usual. The Patrone mark 204, a frame counter 205, and indications 206 and 207 are displayed on the external liquid crystal display panel 202. The Patrone mark 204 indicates that a film is loaded. The frame counter 205 indicates the number of frames that are on standby in preparation for exposure. The indication 206 indicates a shutter speed of 1/1000 as an exposure value, and the indication 207 indicates an f-number. Moreover, if it is detected that the position of the sub mirror is abnormal, a mark 208 indicating that an automatic focus detecting feature does not work is flickered as illustrated.

With the above indications displayed, only the automatic focus detecting feature of all the features of the camera does not work but the other features involving photographic actions work as usual.

Figure 15:
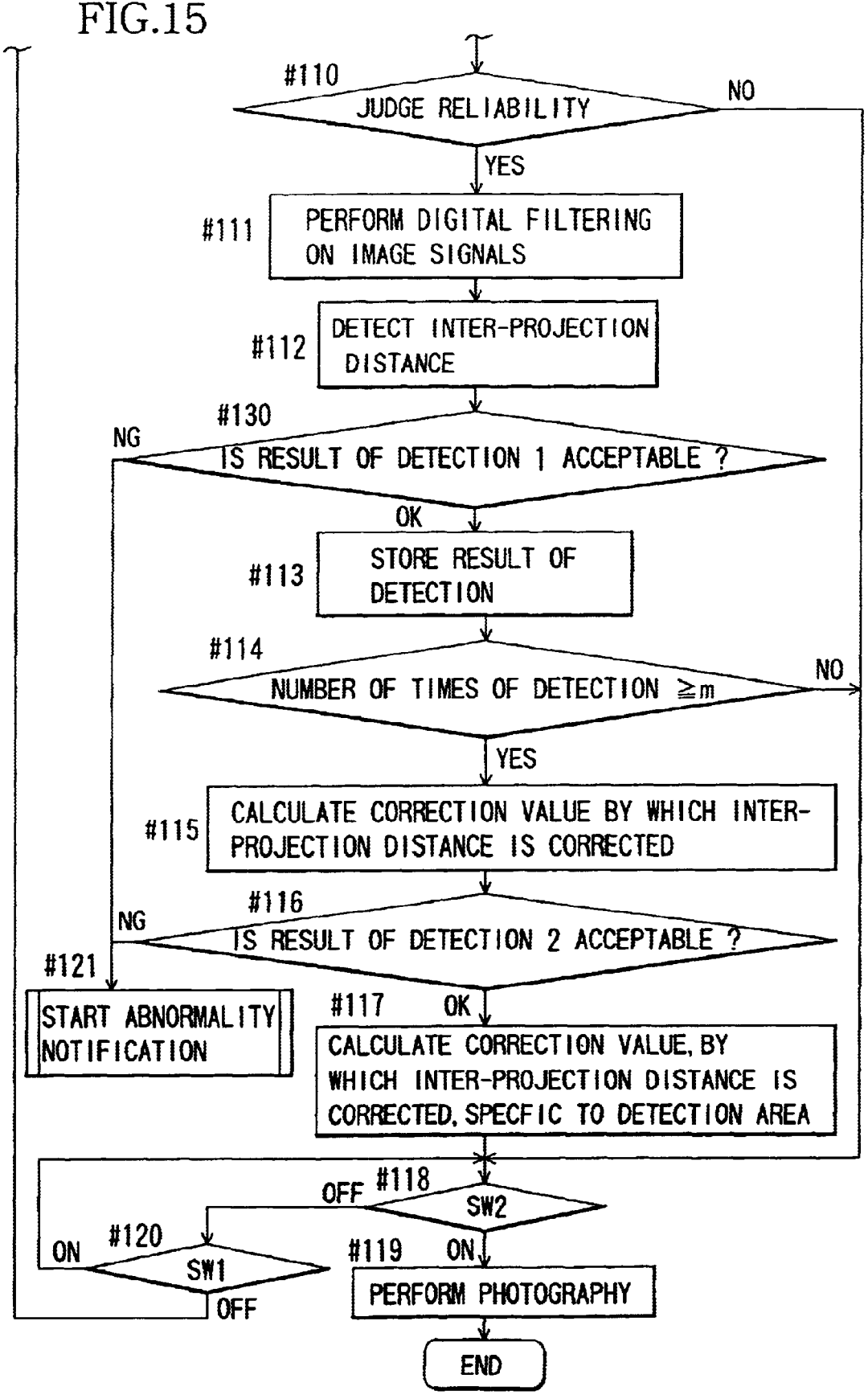
FIG. 15 is a flowchart describing another control sequence related to the present invention.

FIG. 15 is a flowchart describing a first control sequence in which the present invention is implemented. The same step numbers (part of which are omitted) are assigned to steps identical to those described in FIGS. 10(A), (B). The description of the identical steps is omitted. The components of the camera are identical to those of the camera in which the first embodiment is implemented.

At step #112 described in FIG. 15, the representative deviation of an inter-projection distance, $\Delta Z_n$, is calculated according to the expression (2). Control is then passed to step #130, and the representative deviation of an inter-projection distance, $\Delta Z_n$, is judged.

The way of judging the representative deviation of an inter-projection distance, $\Delta Z_n$, will be described in conjunction with FIG. 16.

Figure 16:
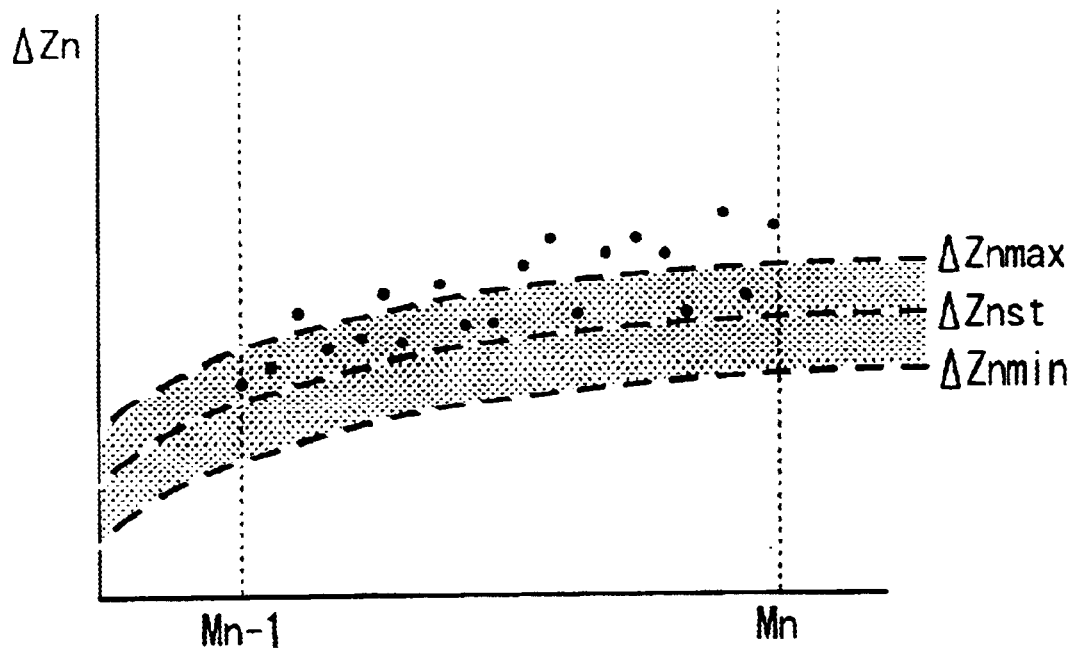
FIG. 16 shows a correction value by which an inter-projection distance is corrected and which is related to the present invention.

FIG. 16 is a scatter diagram indicating values the typical deviation of an inter-projection distance, $\Delta Z_n$, assumes during a certain period. In FIG. 16, a standard value of the representative deviation of an inter-projection distance, $\Delta Z_{nst}$, is calculated based on experimentally acquired data and stored in a memory in association with the number of movements made by the main mirror 103 and sub mirror 107. Moreover, a maximum permissible value $\Delta Z_{nmax}$ is set relative to the standard value $\Delta Z_{nst}$. If the representative deviation of an inter-projection distance, $\Delta Z_n$, assumes a value larger than the maximum permissible value, it is judged that the position of the sub mirror 107 is abnormal. Likewise, a minimum permissible value is set relative to the standard value $\Delta Z_{nst}$. If the representative deviation of an inter-projection distance, $\Delta Z_n$, assumes a value smaller than the minimum permissible value, it is judged that the position of the sub mirror 107 is abnormal These values are determined based on experimentally acquired data. As long as the camera operates normally, it is judged these values will not be exceeded. However, consideration must be taken into differences of one member or the like from another in terms of various factors.

However, neither influence of a minute difference of the standstill position of the sub mirror 107 from the standstill position thereof observed after the previous movement nor influence of a difference in a focus detection signal from object to object is negligible. Therefore, even if the calculated representative deviation of an inter-projection distance assumes a value larger than the maximum permissible value $\Delta Z_{nmax}$ once, it cannot be judged that the position of the sub mirror 107 is abnormal.

In this example, twenty calculated values are checked during one time interval between the times of detection. Herein, ten calculated values are larger than the maximum permissible value $\Delta Z_{nmax}$. It is therefore judged that the position of the sub mirror 107 is abnormal.

At step #130 described in FIG. 15, the number of times by which a calculated value is out of a range of permissible values is equal to or larger than a predetermined value (for example, ten or more out of twenty calculated values are equal to or larger than a predetermined value), it is judged that the position of the sub mirror 107 is no good (NG) or abnormal. Control is then passed to step #121. The same abnormality notification routine as that described in relation to the first embodiment is run. If the number of times by which a calculated value is out of the range of permissible values is equal to or smaller than a predetermined value, it is judged that the position of the sub mirror 107 is OK. Control is then passed to step #113, and the same routine as that performed in the first embodiment is run.

The predetermined value adopted at step #130 is a value statistically determined based on experimentally acquired data.

Next, another example will be described. The actions performed by the major portion are identical to those (FIG. 15) performed by the major portion of the camera in which the first embodiment is implemented. However, the way of judging the calculated representative deviation of an inter-projection distance, $\Delta Z_n$, at step #130 is different.

The way of judging the calculated representative deviation of an inter-projection distance, $\Delta Z_n$, at step #130 will be described in conjunction with FIG. 17.

Figure 17:
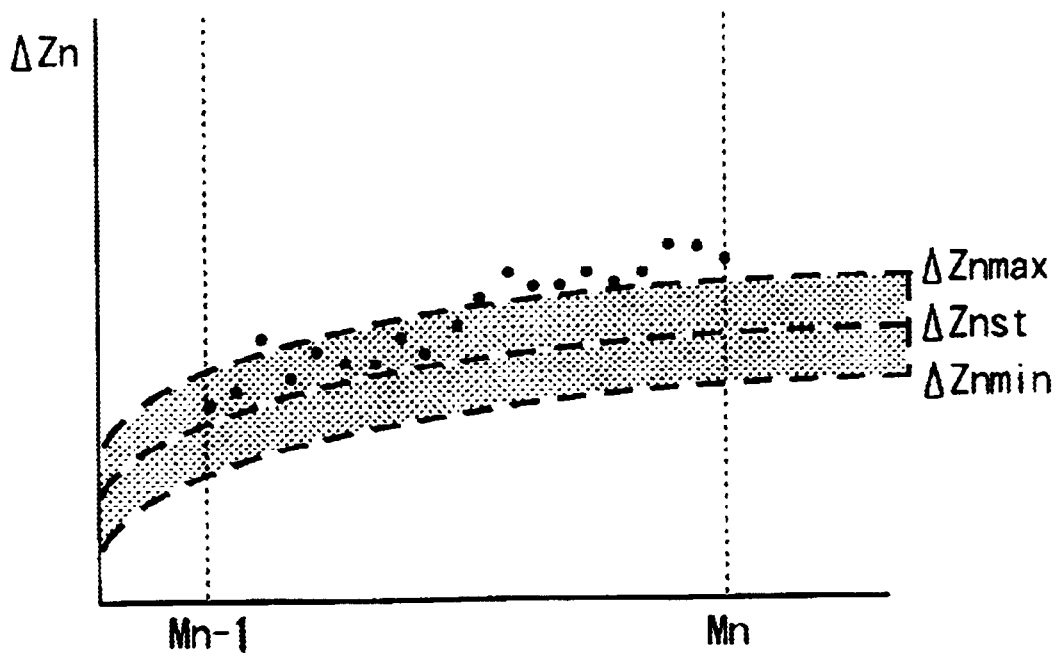
FIG. 17 shows a correction value by which an inter-projection distance is corrected and which is related to the present invention.

FIG. 17 is a scatter diagram indicating values the representative deviation of an inter-projection distance, $\Delta Z_n$, assumes during a certain interval between the times of detection. The standard value $\Delta Z_{nst}$, maximum permissible value $\Delta Z_{nmax}$, and minimum permissible value $\Delta Z_{nmin}$ are defined in the same manner as those in the aforesaid example.

In this example, twenty calculated values are checked per interval between the times of detection. Herein, ten successive values detected during the second half of the interval are larger than the maximum permissible value $\Delta Z_{nmax}$. It is therefore judged that the position of the sub mirror 107 is abnormal.

At step #130, if the number of successive calculated values that exist out of a range of permissible values is equal to or larger than a predetermined value, it is judged that the position of the sub mirror 107 is no good (NG) or abnormal. Control is then passed to step #121. The same abnormality notification routine as the one employed in the first embodiment is run. Moreover, if the number of successive calculated values that exist out of the range of permissible values is smaller than the predetermined value (for example, less than ten successive calculated values out of twenty values are out of the range of permissible values), it is judged that the position of the sub mirror 107 is OK or normal. Control is then passed to step #113. The same routine as the one employed in the first embodiment is then run.

The predetermined value adopted at step #130 is a value statistically determined based on experimentally acquired data.

As described so far, if it is judged at step #130 that the position of the sub mirror 107 is NG, control is passed to step #121, and the abnormality notification routine is then run. The abnormality notification routine may, as mentioned in relation to the first embodiment, prohibit movements and inhibits a user from proceeding with photography carelessly. Otherwise, as mentioned in relation to the example of the first embodiment, the abnormality notification routine may prohibit only an action of focus detection among all the photographic actions performed in a camera and achieve the other photographic actions as usual.

According to the aforesaid embodiment and example, based on the result of the judgment made at step #116 described in FIG. 10, or step #130 or step #116 described in FIG. 15, control is passed to the abnormality notification routine or photographic actions including focus detection. With an increase in the number of movements made by the sub mirror, the relative positions of the sub mirror and image sensor 118 change to deviates from those attained in the initial state. Consequently, the position of the sub mirror may shift. Nevertheless, high-precision focus detection can be achieved while being unaffected by the shift in the position of the sub mirror. Moreover, an abnormal state of the sub mirror is identified in order to prevent unsuccessful photography.

More particularly, if the result of the detection performed at any of the foregoing steps demonstrates that the position of the sub mirror is NG, that is, if it is judged that a correction value is out of a predetermined range, an abnormality of a camera is notified using the external liquid crystal unit (otherwise, any other display unit or a buzzer will do). A user is therefore notified of a possibility that photographic actions may not be performed normally. Unsuccessful photography can be avoided.

If a correction value is out of a predetermined range as mentioned above, focus detection or movements to be made for focusing the photography lens are prohibited, but photographic actions other than an automatic focusing action are achieved. In case of emergency or in case photography to be performed using a distance-to-lens indicator or the like is acceptable, photography is enabled.

Moreover, it is judged whether the result of detection of the light distributions that represent the projections of each of the patterns 8a and 8b is within a predetermined range. Occurrence of an abnormality can therefore be detected shortly.

As described in conjunction with FIG. 16, if the number of times by which a calculated value is out of a range of permissible values is equal to or larger than a predetermined value, it is judged that the position of the sub mirror 107 is no good (NG). An abnormality of a camera is then notified. Consequently, occurrence of an abnormality is detected highly reliably while being unaffected by a minute difference of the standstill position of the sub mirror from the standstill position thereof attained after the previous movement or a difference in a focus detection signal from object to object. Therefore, a photographer is notified of a possibility that photography may not be performed normally, and prevented from performing unsuccessful photography. In this case, an action of focus detection or automatic focusing of the photography lens is prohibited but photographic actions other that automatic focusing action are achieved. In case of emergency or in case photography to be performed using a distance-to-lens indicator or the like is acceptable, photography is enabled.

As described in conjunction with FIG. 17, if the number of successive calculated values that exist out of a range of permissible values is equal to or larger than a predetermined value, it is judged that the position of the sub mirror is NG or abnormal. An abnormality of a camera is then notified. Similarly to the case described in conjunction with FIG. 16, occurrence of an abnormality is detected highly reliably while being unaffected by a minute difference of the standstill position of the sub mirror from the standstill position thereof attained after the previous movement or a difference in a focus detection signal from object to object. Consequently, a user is notified of a possibility that photography may not be performed normally, and prevented from performing unsuccessful photography. In this case, an action of focus detection or automatic focusing of the photography lens is prohibited but photographic actions other than the automatic focusing action are achived. In case of emergency or in case photography to be performed using a distance-to-lens indicator or the like is acceptable, photography is enabled.

A second embodiment different from the first embodiment in terms of the patterns inscribed on the sub mirror 107 will be described below. The present embodiment is an improvement of the first embodiment in the number of patterns inscribed on the sub mirror 107, the positions thereof, or the shape thereof, and in the way of correcting a deviation of an inter-projection distance derived from a shift in the standstill position of the sub mirror 107. The other members and features are identical to those of the first embodiment, and the description of the members and features is omitted. The drawings referred to in relation to the first embodiment may be referred to again, and the reference numerals assigned to the components of the first embodiment may be employed as they are.

Figure 18:
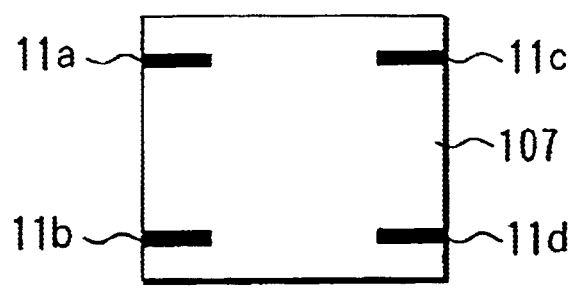
FIG. 18 shows other patterns inscribed on a sub mirror 107 and related to the present invention.

FIG. 18 is a plan view of the reflecting surface of the sub mirror 107 shown in FIG. 1 that is seen from the photography lens. Patterns 11a, 11b, 11c, and 11d that are straight lines are inscribed by adopting a means such as printing.

Figure 19:
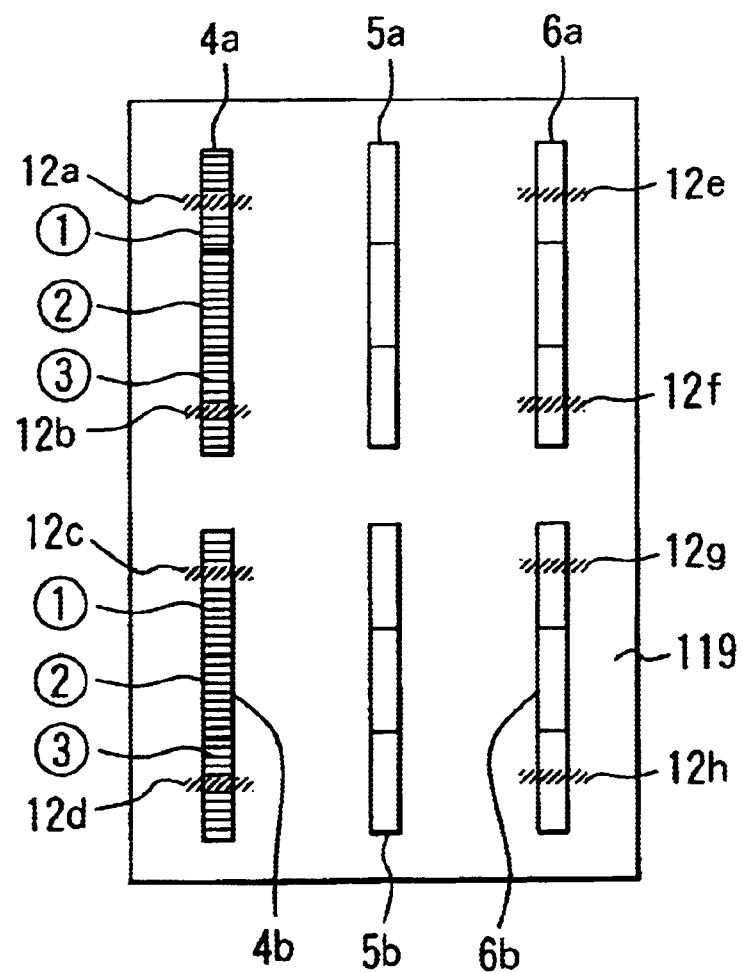
FIG. 19 shows how the patterns shown in FIG. 18 are projected on an image sensor.

FIG. 19 shows the projections of the patterns 11a to 11d inscribed on the sub mirror 107 which are formed on the image sensor 118, which is shown in FIG. 2, in an initial state in which the standstill position of the sub mirror 107 is not shifted. The pattern projections 12a, 12b, 12c, 12d, 12e, 12f, 12g, and 12h are shown as hatched areas in FIG. 19.

The pattern projections 12a to 12h are formed in the area portions (1) and (3) of the photoelectric converter trains 4a, 4b, 6a, and 6b of the image sensor 118 that are not used to focus the photography lens on an object. The pair of pattern projections 12a and 12c is the projections of the pattern 11a. The pair of pattern projections 12b and 12d is the projections of the pattern 11b. The pair of pattern projections 12e and 12g is the projections of the pattern 11c. The pair of pattern projections 12f and 12h is the projections of the pattern 11d.

Figure 20:
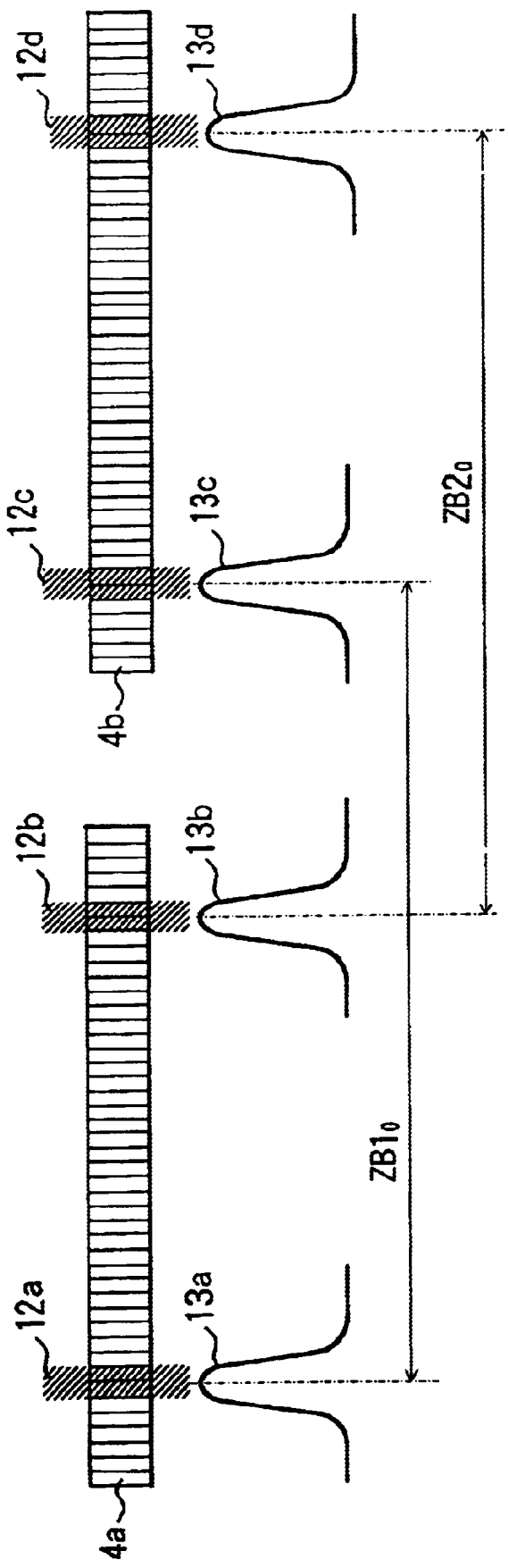
FIG. 20 shows the image sensor shown in FIG. 19 in enlargement.

FIG. 20 shows in enlargement the photoelectric converter trains 4a and 4b shown in FIG. 19. In FIG. 20, there are shown pattern projection signals 13a, 13b, 13c, and 13d produced by the photoelectric converter trains 4a and 4b. An inter-projection distance $Z_{B10}$ results from known inter-projection distance detection that is performed using the projection signals 13a and 13c. Likewise, an inter-projection distance $ZB_{20}$ is calculated using the projection signals 13b and 13d.

Similarly to the first embodiment, the patterns 11 on the sub mirror 107 are located away from the primary image plane 102a. Therefore, the pairs of pattern projections 12a to 12d formed on the image sensor 118 are blurred in reality. Moreover, the positions at which the pattern projections 12 to 12d are formed on the image sensor 118 slightly deviates from the positions that are optically conjugate to the position of the primary image plane 102a. Nevertheless, when an object of an appropriate homogeneous luminance is imaged, the inter-projection distances $ZB_{a0}$ and $ZB_{b0}$ can be calculated through inter-projection detection. Furthermore, according to the present embodiment, the patterns on the sub mirror 107 are straight lines. The pattern projection signals each has a high-luminance component (exhibiting a peak voltage) and two low-luminance component that appear flat. Therefore, the inter-projection distance can be detected more highly precisely than that in the first embodiment. Incidentally, the inter-projection distance between projections formed on the photoelectric converter trains 6a and 6b can be calculated according to the same principles. Moreover, when the standstill position of the sub mirror 107 shifts, the same actions as those in the first embodiment are carried out.

The action of focus detection including detection of pattern projections that is performed actually in a camera is identical to that described in relation to the first embodiment. The description of the action is therefore omitted. A description will be made of correction of a change in an inter-projection distance caused by a shift in the standstill position of the sub mirror 107.

The numbers of times of detection by which the patterns 11a, 11b, 11c, and 11d are used for focus detection shall be o, p, q, and r respectively. Deviations of inter-projection distances, each of which is a distance between the projections of each of the patterns, from stored values, $\Delta Z_{ao}$, $\Delta Z_{bp}$, $\Delta Z_{cq}$, and $\Delta Z_{dr}$, are calculated according to the expression (1) described in relation to the first embodiment. The smallest number of times of detection among the numbers of times of detection o, p, q, and r shall be n and stored in the EEPROM 109d. At the same time, the deviations of inter-projection distances, each of which is a distance between the projections of each of the patterns, $\Delta Z_{ao}$, $\Delta Z_{bp}$, $\Delta Z_{cq}$, and $\Delta Z_{dr}$, are stored in the EEPROM 109d.

Next, when the number of times of detection n reaches a threshold m, inter-projection distances are corrected as they are in the first embodiment.

The deviation of an inter-projection distance between the projections of the pattern 11a shall assume a plurality of values $\Delta Z_{a1}$, $\Delta Z_{a2}$, etc., $\Delta Z_{am}$, etc. A correction value for the inter-projection distance between the projections of the pattern 11a calculated using the plurality of values shall be $\Delta Z_{aC}$. The correction value for the inter-projection distance, $\Delta Z_{aC}$, is calculated using the plurality of values $\Delta Z_{a1}$, $\Delta Z_{a2}$, etc., $\Delta Z_{am}$ that are stored in the EEPROM 109d. At the same time, a correction value for the inter-projection distance between the projections of each of the patterns 11b, 11c, and 11d shall be $\Delta Z_{bC}$, $\Delta Z_{cC}$, or $\Delta Z_{dC}$. The correction values for the inter-projection distances, $\Delta Z_{bC}$, $\Delta Z_{cC}$, and $\Delta Z_{dC}$ are calculated in the same manner.

Next, a description will be made of calculation of a correction value for an inter-projection distance specific to a focus detection area.

Referring to FIG. 19, the pattern projections 12a, 12b, 12e, and 12f of the patterns 11a to 11d on the sub mirror 107 are formed on the corners of a field defined with the upper photoelectric converter trains 4a, 5a, and 6a out of the pairs of the photoelectric converter trains. A displacement of an image to be formed in the field used to focus the photography lens on an object can be interpolated using displacements of some of the pattern projections formed on the corners of the field.

The same applies to the lower photoelectric converter trains 4b, 5b, and 6b in FIG. 19. A correction value for an inter-projection distance specific to each of five focus detection areas shown in FIG. 3 can be interpolated using the correction values for the inter-projection distances $\Delta Z_{aC}$, $\Delta Z_{bC}$, $\Delta Z_{cC}$, and $\Delta Z_{dC}$.

Specifically, a correction value for an inter-projection distance specific to a focus detection area coincident with the focus detection frame 7a shown in FIG. 3 is interpolated using the correction values for the inter-projection distances between the projections of the pattern 11a and between the projections of the pattern 11b. A correction value for an inter-projection distance specific to a focus detection area coincident with the focus detection frame 7b is interpolated using the correction values for the inter-projection distances between the projections of the pattern 11a and between the projections of the pattern 11c. A correction value for an inter-projection distance specific to a focus detection area coincident with the focus detection frame 7c is interpolated using the correction values for the inter-projection distances between the projections of the pattern 11a or 11b and between the projections of the pattern 11d or 11c. A correction value for an inter-projection distance specific to a focus detection area coincident with the focus detection frame 7d is interpolated using the correction values for the inter-projection distances between the projections of the pattern 11c and between the projections of the pattern 11d. A correction value for an inter-projection distance specific to a focus detection area coincident with the focus detection frame 7e is interpolated using the correction values for the inter-projection distances between the projections of the pattern 11b and the projections of the pattern 11d. For example, a correction value for an inter-projection distance specific to the focus detection area coincident with the focus detection frame 7a shall be $\Delta Z_{FP1C}$. On the assumption that a correction value for an inter-projection distance between projections formed with light that passes through a portion of the sub mirror 107 interposed between the patterns has a linear relation to a distance from one of the patterns, the correction value for an inter-projection distance specific to the focus detection area coincident with the focus detection frame 7a, $\Delta Z_{FP1C}$, is calculated according to an expression (6).

$$\Delta Z_{FP1C}=(\Delta Z_{aC}+\Delta Z_{bC})/2 \tag{6}$$

Similarly, assuming that the correction value for an inter-projection distance specific to a focus detection area coincident with each of the focus detection frames 7b, 7c, 7d, and 7e is $\Delta Z_{FP2C}$, $\Delta Z_{FP3C}$, $\Delta Z_{FP4C}$, or $\Delta Z_{FP5C}$, the correction values are calculated according to the expressions (7) to (10) as follows:

$$\Delta Z_{FP2C}=(\Delta Z_{aC}+\Delta Z_{cC})/2 \tag{7}$$

$$\Delta Z_{FP3C}=(\Delta Z_{dC}+\Delta Z_{dC})/2 \tag{8}$$

$$\Delta Z_{FP4C}=(\Delta Z_{bC}+\Delta Z_{dC})/2 \tag{9}$$

$$\Delta Z_{FP5C}=(\Delta Z_{cC}+\Delta Z_{dC})/2 \tag{10}$$

The correction value for the inter-projection distance specific to the focus detection area coincident with the focus detection frame 7c, $\Delta Z_{FP3C}$, given by the expression (8) may be calculated by substituting the correction values for the inter-projection distances $\Delta Z_{bc}$ and $\Delta Z_{dc}$ for $\Delta Z_{aC}$ and $\Delta Z_{dC}$. Otherwise, the results of both the calculations may be utilized. By assigning the correction value for the inter-projection distance specific to the focus detection area coincident with the focus detection frame 7c, $\Delta Z_{FP3C}$, to the expression (4) employed in the first embodiment, a deviation of the inter-projection distance caused by a shift in the standstill position of the sub mirror 107 can be corrected highly precisely.

As mentioned above, according to the second embodiment, a coefficient $C_{FP}$ associated with a focus detection area and determined based on the results of an experiment is not used as it is not used in the calculation of solving the expression (3) described in relation to the first embodiment. Based on the results of detection of the projections of the patterns 11a to 11d formed on the corners of the sub mirror 107, an inter-projection distance observed in each focus detection area is corrected. Even if the shift in the standstill position of the sub mirror 107 differs among individual sub mirrors, correction can be achieved highly precisely.

A straight line is adopted as each of the patterns on the sub mirror 107. Compared with the first embodiment, an error in the result of the arithmetic of an inter-projection distance can be decreased. If a pattern composed of two lines of different thicknesses is adopted, the error in the result of the arithmetic of an inter-projection distance would be further reduced.

According to the second embodiment, an inter-projection distance specific to each of the five focus detection areas is corrected based on the result of detection of the projections of two of the four patterns 11a to 11d. Even if a larger number of focus detection areas is defined, an inter-projection distance specific to each of the focus detection areas can be corrected highly precisely through interpolation to be performed using the results of detection of the projections of two of the patterns 11a to 11d. Moreover, if the number of patterns is increased, a larger number of results of detection would be used for interpolation. Consequently, an inter-projection distance can be corrected more highly precisely.

According to the aforesaid embodiments, patterns are inscribed within the effective range of the sub mirror 107 that is an optical member for use in routing light to the image sensor 118. The image sensor 118 detects the light distributions that represent the projections of each of the patterns. Even if the relative positions of the sub mirror 107 and image sensor 118 deviates from the positions attained in the initial state because of an increase in the number of movements made by the sub mirror, the image sensor 118 can detect the inconsistency between the light distributions that represent the projections of each of the patterns. Consequently, the shift in the position of the sub mirror 107 can be learned.

The degree of focusing (information concerning focus detection) to which the photography lens 101 is focused is corrected based on the result of detection of the light distributions that represent the projections of each of the patterns which is performed by the image sensor 118. High-precision focus detection can therefore be achieved while being unaffected by a shift in the position of the sub mirror 107.

At least one pattern is inscribed near an edge of the sub mirror 107. The pattern will therefore not occupy the effective range on the sub mirror 107 that is used to focus the photography lens on an object. Moreover, the light distributions that represent the projections of the pattern can be detected without interference in any focus detection area. Moreover, if the light distributions that represent the projections of each of a plurality of patterns are employed for correction, focus detection can be achieved more highly precisely.

According to the second embodiment, lines are adopted as the patterns. This results in a reduced error in the result of arithmetic of an inter-projection distance. Consequently, an inter-projection distance can be detected more highly precisely.

Next, a description will be made of focus detection that is performed in a camera, which can be set to a continuous servo automatic focusing (AF) mode, with the camera set to the continuous servo AF mode. In the continuous servo AF mode, the lens driving mechanism 113 is controlled so that the lens driving mechanism 113 will follow a shift in the focus of the photography lens 101 derived from a movement made by an object. The basic configuration of the camera is identical to that of the camera in which the first embodiment is implemented. The same reference numerals are assigned to components identical to those of the camera in which the first embodiment is implemented.

Figure 21:
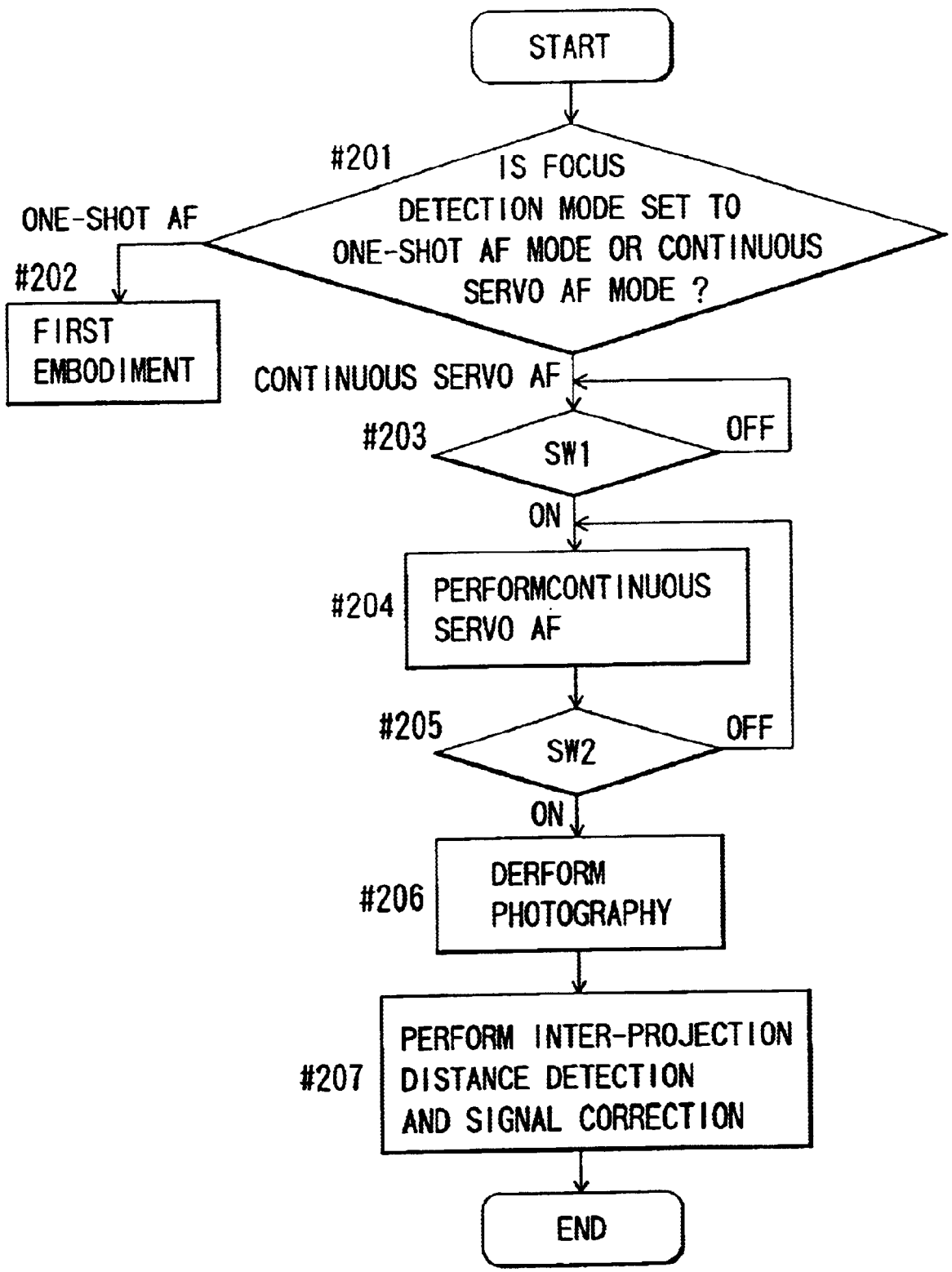
FIG. 21 is a flowchart describing another control sequence related to the present invention.

FIG. 21 is a flowchart describing a focus detection program stored in the ROM 109b incorporated in the camera.

At step #201, the CPU 109a judges whether the camera is set to a one-shot AF mode or the continuous servo AF mode. In the one-shot AF mode, once the photography lens 101 is brought into focus, driving the photography lens 101 is prohibited. If the camera is set to the one-shot AF mode, control is passed to step #202. If the camera is set to the continuous servo AF mode, control is passed to step #203.

A photographer designates any AF mode of the camera by manipulating an AF mode selecting member that is not shown. Processing to be performed at step #202 when the one-shot AF mode is designated is identical to the processing from steps #101 to #117 described in FIG. 10 in relation to the first embodiment.

At step #203, it is judged whether the switch SW1 is turned on with the first stroke given to the release button. If the switch SW1 is turned on, control is passed to step #204. If the switch SW1 is turned off, a standby state is established.

At step #204, continuous servo AF is executed in order to control driving of the photography lens 101 so that the photography lens 101 will be focused on a moving object. Control is then passed to step #205. The concrete actions to be performed in the camera in the continuous servo AF mode are identical to those conventionally performed.

At step #205, it is judged whether the switch SW2 is turned on with the second stroke given to the release button. If the switch SW2 is turned on, control is passed to step #206. If the switch SW2 is turned off, control is returned to step #204 of continuous servo AF. If the switch SW1 is held on and the switch SW2 is turned off, the continuous servo AF of step #204 is repeated in order to follow a moving object.

At step #206, the mirror driving mechanism 111 is actuated using the mirror drive circuit 112. The main mirror 103 and sub mirror 107 are driven to recede from the photographic light path, and the shutter that is not shown is opened and closed in order to project an image on the image recording medium 102. Control is then passed to step #207.

At step #207, an inter-projection distance between the projections of each of the pattern 8a and pattern 8b inscribed on the sub mirror 107 which are formed on the image sensor 118 is detected. A focus detection signal is corrected in order to compensate a shift in the standstill position of the sub mirror 107. The processing of step #207 is identical to the processing of step #109 to step #115 described in FIG. 10 in relation to the first embodiment.

As described so far, in the present embodiment, while focus detection for focusing the photography lens on a moving object and photography (these process are generically called photography) are under way in the continuous servo AF mode, neither detection of an inter-projection distance nor rewriting of a reference inter-projection distance is carried out. The reference inter-projection distance serves as a reference with which an inter-projection distance detected after a shift in the standstill position of the sub mirror 107 is compared. After photography is completed, detection of an inter-projection distance and rewriting of a reference inter-projection distance specific to a detection area are carried out. Therefore, in the continuous servo AF mode in which the efficiency of the photography lens 101 in following a moving object depends on a load of photography, the efficiency in following the moving object will not be impaired.

Next, a description will be made of focus detection to be performed with a camera, which can be set to a continuous photography mode, set to the continuous photography mode. In continuous photography mode, a plurality of images is produced with the shutter, which is not shown, opened and closed continuously. The basic constitution of the camera is identical to that of the camera in which the first embodiment is implemented. The same reference numerals will be assigned to components identical to those of the components of the camera.

Figure 22:
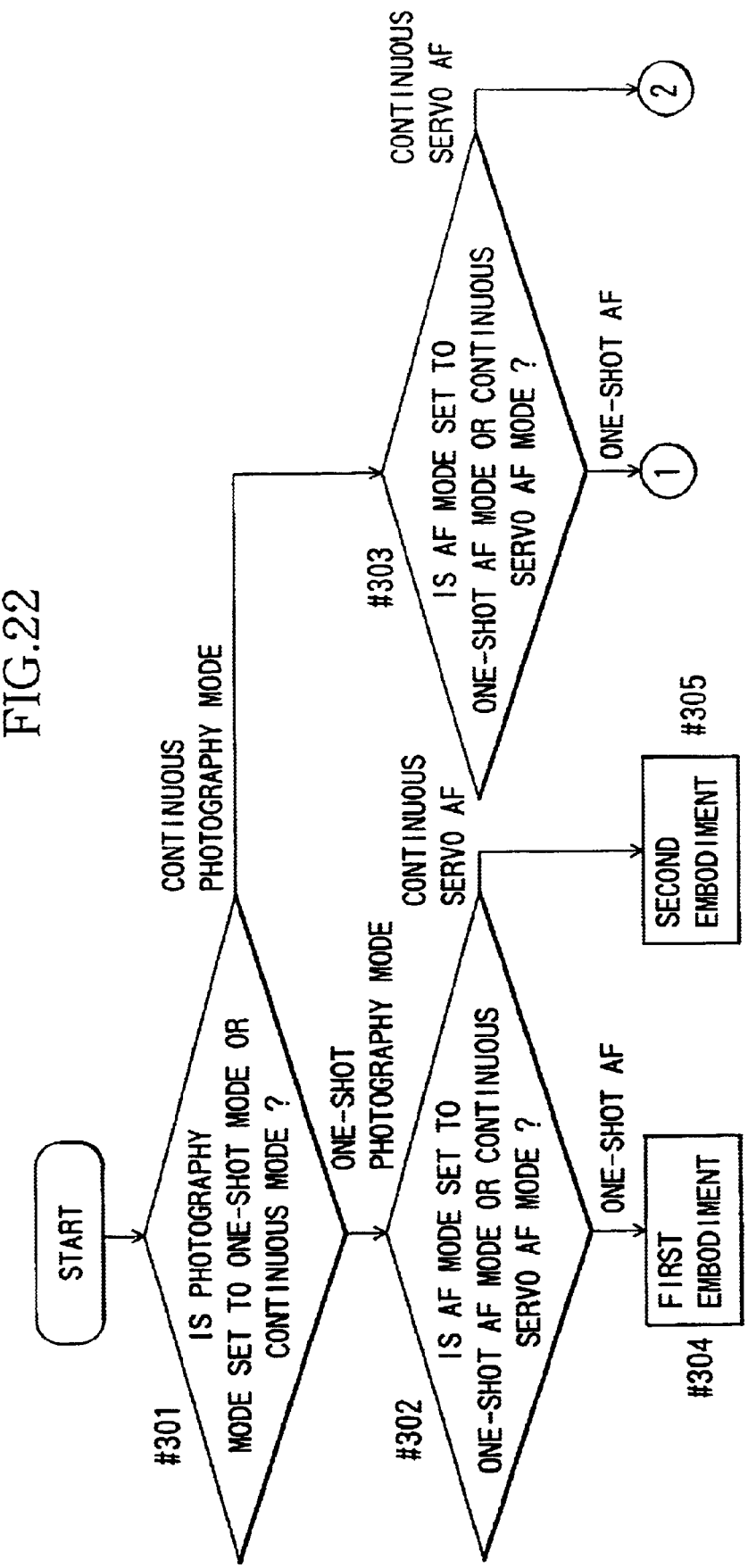
FIG. 22 is a flowchart describing another control sequence related to the present invention.

FIG. 22 is a flowchart describing a focus detection program stored in the ROM 109b incorporated in the camera.

At step #301, it is judged whether the camera is set to either a one-shot photography mode or the continuous photography mode. In the one-shot photography mode, continuous photography is prohibited after one shot is completed. If the camera is set to the one-shot mode, control is passed to step #302. If the camera is set to the continuous mode, control is passed to step #203.

Incidentally, a photographer designates the photography mode of the camera by manipulating the photography mode selecting member that is not shown.

If the camera is set to the one-shot mode, that is, at step #302, it is judged whether the camera is set to either the one-shot AF mode or the continuous servo AF mode. If the camera is set to the one-shot AF mode, control is passed to step #304. If the camera is set to the continuous servo AF mode, control is passed to step #305.

The processing of step #304 to be performed with the camera set to the one-shot photography mode and one-shot AF mode is identical to the processing of step #101 to step #117 described in FIG. 10 in relation to the first embodiment.

Moreover, the processing of step #305 to be performed with the camera set to the continuous photography mode and one-shot AF mode is identical to the processing of step #203 to step #207 described in FIG. 11.

When the camera is set to the continuous photography mode, that is, at step #303, similarly to step #302, it is judged whether the camera is set to either the one-shot AF mode or continuous servo AF mode. If the camera is set to the one-shot AF mode, control is passed to step #306 described in FIG. 13. The step #306 is carried out with the camera set to the continuous photography mode and one-shot AF mode. If the camera is set to the continuous servo AF mode, control is passed to step #313 that is performed with the camera set to the continuous photography mode and continuous servo AF mode.

Figure 23:
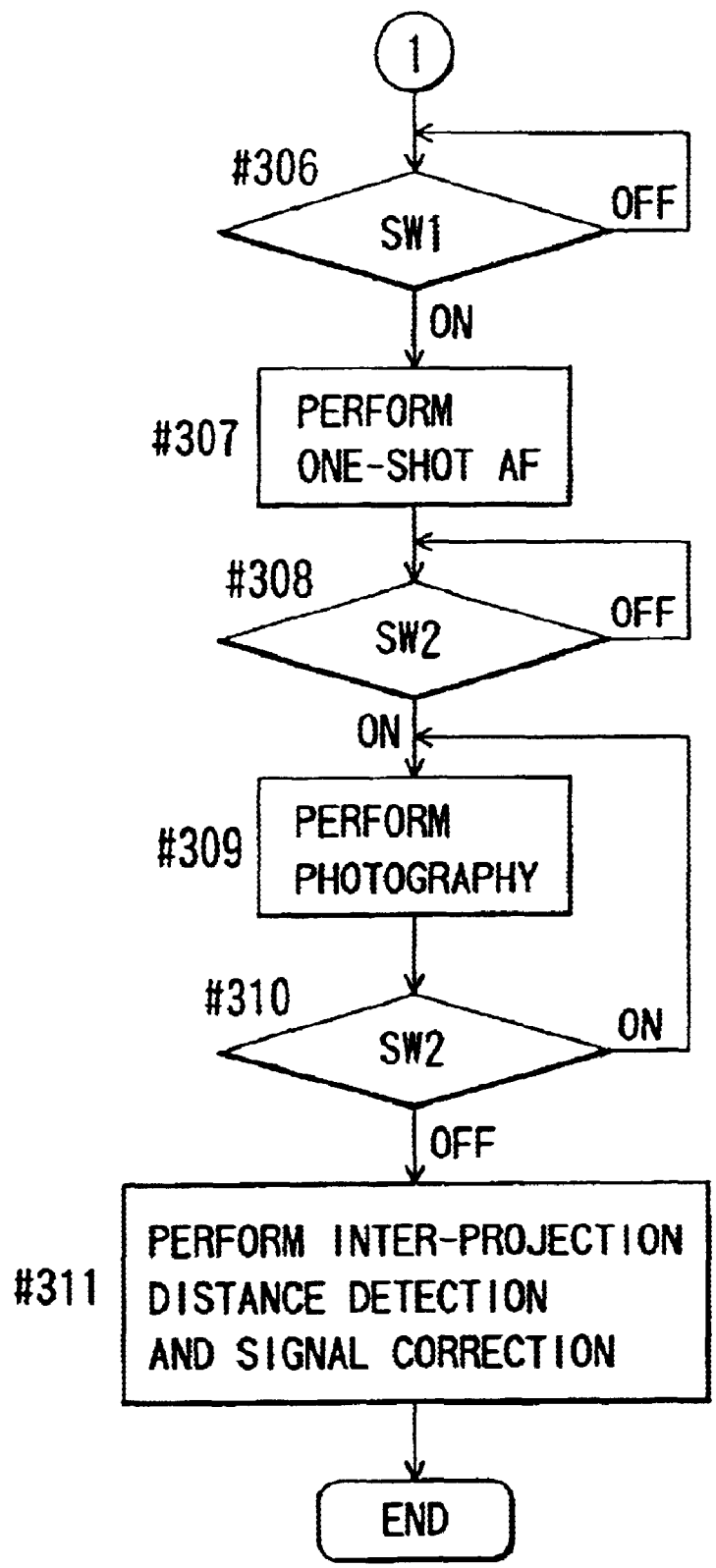
FIG. 23 is a flowchart describing another control sequence related to the present invention.

Referring to FIG. 23, processing to be performed with the camera set to the continuous photography mode and one-shot AF mode will be described below.

At step #306, it is judged whether the switch SW1 is turned on with the first stroke given to the release button. If the switch SW1 is turned on, control is passed to step #204. If the switch SW1 is not on, a standby state is established.

At step #307, focus detection and lens driving are performed in the one-shot AF mode as they are at step #102 to step #108 in the first embodiment.

At step #308, it is judged whether the switch SW2 is turned on with the second stroke given to the release button. If the switch SW2 is on, control is passed to step #309. If the switch SW2 is not on, a standby state is established.

At step #309, the mirror driving mechanism 111 is actuated using the mirror drive circuit 112. The main mirror 103 and sub mirror 107 are driven to recede from the photographic light path. The shutter that is not shown is opened and closed in order to project an image on the image recording medium 102. Control is then passed to step #310.

At step #310, it is judged whether the switch SW2 is held on with the second stroke given to the release button. If the switch SW2 is on, control is returned to photography of step #309. If the switch SW2 is turned off, control is passed to step #311. If the switch SW1 is held on, photography is carried out continuously.

At step #311, the distance between the projections of each of the pattern 8a and pattern 8b inscribed on the sub mirror 107 which are formed on the image sensor 118 is detected. A focus detection signal is corrected in order to compensate a shift in the standstill position of the sub mirror 107. The processing is identical to the processing of step #109 to step #115 described in FIG. 10 in relation to the first embodiment.

Immediately after photography in the one-shot AF mode is completed, the distance between the projections of each pattern is detected, and a focus detection signal is corrected in order to compensate a shift in the standstill position of the sub mirror 107.

Figure 24:
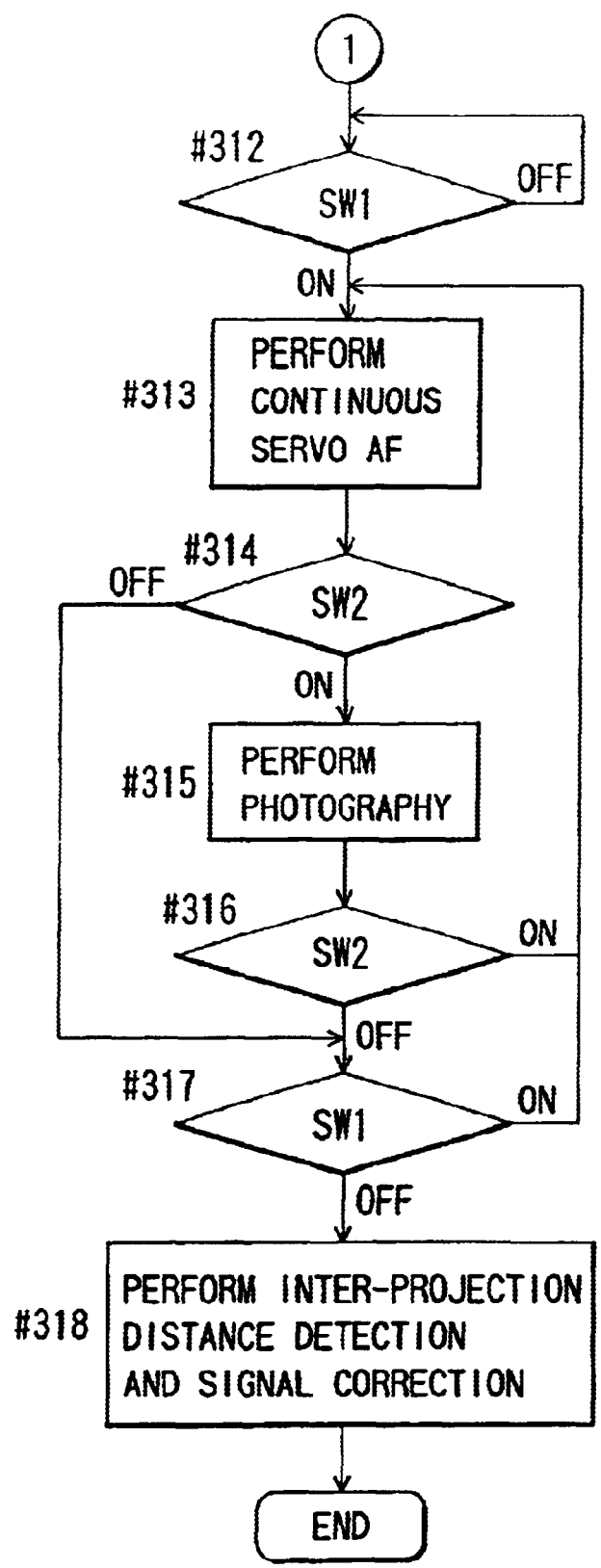
FIG. 24 is a flowchart describing another control sequence related to the present invention.

Next, focus detection to be performed in the continuous photography mode and continuous servo AF mode will be described in conjunction with FIG. 24. At step #312, it is judged whether the switch SW1 is turned on with the first stroke given to the release button. If the switch SW1 is on, control is passed to step #313. If the switch SW1 is not on, a standby state is established.

At step #313, continuous servo AF is executed in order to control driving of the photography lens 101 so that the photography lens 101 will be focused on a moving object. Control is then passed to step #314.

At step #314, it is judged whether the switch SW2 is turned on with the second stroke given to the release button. If the switch SW2 is on, control is passed to step #315. If the switch SW2 is off, control is passed to step #317 at which it is judged whether the switch SW1 is on or off.

At step #315, the mirror driving mechanism 111 is actuated using the mirror drive circuit 112. The main mirror 103 and sub mirror 107 are driven to recede from the photographic light path. The shutter that is not shown is opened and closed in order to project an image on the image recording medium 102. Control is then passed to step #316.

At step #316, it is judged whether the switch SW2 is held on with the second stroke given to the release button. If the switch SW2 is on, control is returned to step #313 of continuous servo AF. The processing of step #313 to step #315 is repeated in order to follow a moving object. In contrast, if the switch SW2 is off, control is passed to step #317 at which it is judged whether the switch SW1 is turned on or off.

At step #317, it is judged whether the switch SW1 is held on with the first stroke given to the release button. If the switch SW1 is on, control is returned to step #313, and continuous servo AF is repeated. If the switch SW1 is off, control is passed to step #318.

When the switch SW2 is off at step #314 and step #316, if the switch SW1 is on at step #317, photography of step #315 is not carried out but continuous servo AF of step #313 is repeated.

At step #308, similarly to at step #311 described in FIG. 23, the distance between the projections of each of the pattern 8a and pattern 8b inscribed on the sub mirror 107 which are formed on the image sensor 118 is detected, and a focus detection signal is corrected in order to compensate a shift in the standstill position of the sub mirror 107.

When photography in the continuous servo AF mode is completed, immediately after the switch SW1 is turned off, the distance between the projections of each of the patterns is detected and a focus detection signal is corrected in order to compensate a shift in the standstill position of the sub mirror 107.

While focus detection and photography (these process are generically called photography) are under way in the continuous photography mode, neither detection of the distance between the projections of each of patterns nor rewriting of an inter-projection distance attained when the photography lens is in focus is carried out. Immediately after photography is completed, the distance between the projections of each of patterns is detected, and the inter-projection distance attained when the photography lens is in focus is rewritten. In the continuous photography mode in which a load of continuous photography dominates a continuous photography rate, the continuous photography rate will not decrease.

In the aforesaid embodiments, a focus detection signal is corrected by correcting inter-projection distances attained when the photography lens is in focus. Alternatively, the focus detection signal itself may be corrected. That is to say, a detected value or calculated value concerning the focus detection signal may be corrected.

In the aforesaid embodiments, the focus detection signal is corrected in order to compensate a shift in the standstill position of the sub mirror attributable to the fact that the mirror driving mechanism is worn down due to an increase in the number of movements made by the sub mirror. The present invention may be applied to a case where the focus detection signal is corrected in order to compensate a shift in the standstill position of the sub mirror attributable to any other factor, for example, a use environment of a camera (temperature or humidity).

In the aforesaid embodiments, the focus detection signal is corrected in order to compensate a shift in the position of the sub mirror that is an optical member. Alternatively, the present invention may be applied to a case where the focus detection signal is corrected in order to compensate a shift in the position of any of optical members that constitute the focus detection optical system.

Furthermore, the present invention can be implemented in either a camera that employs a film or a digital camera.

According to the present invention, patterns are inscribed on an optical member. Based on the results of detection of the light distributions that represent the projections of each of the patterns on a light receiving field, information concerning the focused state of a photography optical system is corrected. Herein, the light distributions change with a shift in the position of the optical member. Consequently, the information concerning the focused state can be acquired highly precisely irrespective of the shift in the position of the optical member.

For example, the optical member may be movable within a movable range that contains a position at which the optical member routes light, which emanates from a photography optical system, to the light receiving field. In this case, the optical member may be displaced from the position, at which the optical member normally routes light to the light receiving field, because a mechanism for driving the optical member is worn down. Nevertheless, precise information concerning the focused state can be acquired.

Moreover, after the photography optical system is focused based on the information concerning the focused state, if the light distributions are detected, a focusing speed will not be impaired.

Moreover, in a mode in which the photography optical system is focused on a moving object, the light distributions may be detected after photography of the moving object is completed. Otherwise, in a mode in which continuous photography is carried out, the light distributions may be detected after the continuous photography is completed. In this case, the features of the modes in which priority is given to the efficiency in following the moving object or a continuous photography rate will not be impaired.

What is claimed is:

1. A focus detecting device for detecting the focus of an objective, comprising:
   a light receiving sensor having a plurality of photoelectric converters;
   an optical member movable between a position on a light path at which said optical member routes light, which comes through said objective, to said light receiving sensor, and a position at which said optical member recedes from the path of the light coming through said objective, said optical member having a member for forming a pattern projection in a predetermined field on said light receiving sensor;
   a focus detection circuit for detecting the focused state of said objective using a light reception signal produced by said light receiving sensor; and
   a calculation circuit for calculating a correction value, which is used for detecting the focused state of said objective by said focus detection circuit, using a plurality of light reception signals indicating the pattern projection produced by the photoelectric converters located in the predetermined field.

2. A focus detecting device according to claim 1, wherein said optical member is a reflecting mirror.

3. A focus detecting device according to claim 1, further comprising a viewfinder, wherein:
   said optical member includes a main mirror that reflects light to said viewfinder when lying on the light path, and a sub mirror that is supported by said main mirror and reflects the light to said light receiving sensor.

4. A focus detecting device according to claim 3, wherein said member for forming the pattern projection is inscribed on said sub mirror.

5. A focus detecting device according to claim 1, wherein:
   said light receiving sensor includes a plurality of pairs of light receiving sensors;
   said focus detection circuit detects the correlation between light reception signals produced by a pair of light receiving sensors so as to detect the focused state of said objective; and
   said calculation circuit detects the correlation between light reception signals produced by other pair of light receiving sensors so as to calculate said correction value.

6. A focus detecting device according to claim 1, wherein said calculation circuit calculates a plurality of said correction values.

7. A focus detecting device according to claim 6, wherein when the number of said correction values exceeds a predetermined value, said calculation circuit calculates a representative correction value in accordance with the number.

8. A focus detecting device according to claim 7, wherein the representative correction value is an average of the plurality of correction values.

9. A focus detecting device according to claim 1, further comprising a circuit that judges whether said correction value is within a predetermined range, that if said correction value is within the predetermined range, adopts the correction value, that if said correction value is out of the predetermined range, does not adopt the correction value.

10. A focus detecting device according to claim 9, further comprising a driving means that drives said objective according to a signal which represents the focused state, and a prohibiting means that when said correction value is out of the predetermined range, prohibits said driving means from driving said objective.

11. A focus detecting device according to claim 9, further comprising an instructing means that when said correction value is out of the predetermined value, instructs warning.

12. A focus detecting device according to claim 1, wherein said focus detecting device is incorporated in a camera.

13. A focus detecting device for detecting the focus of an objective, comprising:
   a light receiving sensor having a plurality of photoelectric converters;
   a reflecting mirror movable between a first position at which said reflecting mirror reflects light that comes through said objective, and routes the light to said light receiving sensor, and a second position at which said reflecting mirror recedes from the path of the light coming through said objective, said reflecting mirror having a member for forming a pattern projection in a predetermined field on said light receiving sensor when lying at said first position, and said reflecting mirror making a return from said first position to said second position or vice versa;
   a first detection circuit for detecting a change in the pattern projection formed in said predetermined field on said light receiving sensor which is observed between before and after said reflecting mirror makes a return;
   a focus detection circuit for detecting the focused state of said objective by using a light reception signal produced in a field other than the predetermined field on said light receiving sensor and a detection value corresponding of the change detected by said first detection circuit.

14. A focus detecting device according to claim 13, further comprising a calculation circuit for calculating a driving amount of said objective based on the focused state.

15. A focus detecting device according to claim 13, further comprising a view finder and a main mirror that reflects light and routes the light to said viewfinder when lying at said first position, wherein said reflecting mirror is supported by said main mirror.

16. A focus detecting device according to claim 13, wherein:

said light receiving sensor includes a plurality of pairs of light receiving sensors;

said focus detection circuit detects the correlation between light reception signals produced by a pair of light receiving sensors so as to detect the focused state of said objective; and said first detection circuit detects the correlation between light reception signals produced by other pair of light receiving sensors so as to detect a change observed between the pairs of light reception signals.

17. A focus detecting device according to claim 13, wherein said first detection circuit calculates a detection value every time said reflecting mirror makes one return out of a plurality of returns.

18. A focus detecting device according to claim 17, wherein when the number of returns exceeds a predetermined value, said first detection circuit calculates a representative detection value in accordance with the number of returns.

19. A focus detecting device according to claim 18, wherein said representative detection value is an average of a plurality of detection values.

20. A focus detecting device according to claim 13, wherein said focus detecting device is incorporated in a camera.

* * * * *

UNITED STATES PATENT AND TRADEMARK OFFICE
CERTIFICATE OF CORRECTION

PATENT NO. : 6,640,054 B2
DATED : October 28, 2003
INVENTOR(S) : Ryo Yamasaki

It is certified that error appears in the above-identified patent and that said Letters Patent is hereby corrected as shown below:

Column 22,
Line 2, delete "$\Delta Z_{FP3C}=(\Delta Z_{dc}+\Delta Z_{dc})12$" and insert -- $\Delta Z_{FP3C}=(\Delta Z_{ac}+\Delta Z_{dc})12$ --.

Signed and Sealed this

Seventh Day of March, 2006

JON W. DUDAS
*Director of the United States Patent and Trademark Office*